United States Patent [19]
Koenig et al.

[11] Patent Number: 6,144,736
[45] Date of Patent: Nov. 7, 2000

[54] T1 CHANNEL BANK CONTROL AND APPARATUS

[75] Inventors: Roger L. Koenig; Thomas Bullington; Phillip Clark, all of Boulder, Colo.

[73] Assignee: Carrier Access Corporation, Boulder, Colo.

[21] Appl. No.: 09/346,406

[22] Filed: Jul. 1, 1999

Related U.S. Application Data

[60] Continuation of application No. 08/781,485, Jan. 10, 1997, which is a division of application No. 08/440,099, May 12, 1995, Pat. No. 5,740,241.

[51] Int. Cl.⁷ ................................................. H04M 1/00
[52] U.S. Cl. ........................ 379/399; 379/322; 379/413; 363/45
[58] Field of Search ........................... 379/399, 413, 379/398, 322; 323/223, 217–220, 224, 226, 229, 230, 231; 363/45, 46, 48, 51, 52, 53, 21

[56] References Cited

U.S. PATENT DOCUMENTS

| | | | |
|---|---|---|---|
| 4,402,039 | 8/1983 | Jirka | 379/413 |
| 4,458,112 | 7/1984 | Svala | 379/413 |
| 4,472,608 | 9/1984 | Burne | 379/399 |
| 4,499,532 | 2/1985 | Hudson et al. | 363/21 |
| 4,511,763 | 4/1985 | Skidanenko et al. | 379/413 |
| 4,524,246 | 6/1985 | Meza | 379/377 |
| 4,563,547 | 1/1986 | Booth | 379/342 |
| 4,648,019 | 3/1987 | Stahl | 379/413 |
| 4,665,547 | 5/1987 | Tuhy, Jr. | 379/402 |
| 4,679,132 | 7/1987 | Jirka | 379/413 |
| 4,679,232 | 7/1987 | Brooks et al. | 379/413 |
| 4,760,595 | 7/1988 | Arai | 379/413 |
| 4,767,980 | 8/1988 | Chen et al. | 379/413 |
| 4,792,887 | 12/1988 | Bernitz et al. | 363/89 |
| 4,864,609 | 9/1989 | Moisin | 379/413 |
| 4,914,690 | 4/1990 | Hagedorn | 379/88 |
| 4,955,053 | 9/1990 | Siegmund | 379/253 |
| 5,050,210 | 9/1991 | Dillon et al. | 379/413 |
| 5,175,764 | 12/1992 | Patel et al. | 379/412 |
| 5,323,461 | 6/1994 | Rosenbaum | 379/399 |
| 5,514,967 | 5/1996 | Zelm | 324/551 |

*Primary Examiner*—Forester W. Isen
*Assistant Examiner*—Jacques Saint-Surin
*Attorney, Agent, or Firm*—Rick Martin; Patent Law Offices of Rick Martin, P.C.

[57] ABSTRACT

A technique for powering telephone lines using an unbalance current source and current sink; and a technique for improving attenuation/frequency distribution and return loss (impedance matching) of transformer-coupled wire-line communications circuits by using secondary series capacitance and an AC current pump signal source; and a generation of ringing voltage as positive voltage pulses with respect to a negative power supply voltage; and a technique for removal of AC power ripple by using an active linear floating filter for the purpose of powering telephone line circuits, and a technique for injection of real time tone samples into T1 transmissions circuits by use of a T1 framer idle code register. The combination of the above five circuit techniques provides for the hardware implementation of a single printed circuit board embodiment (Line Interface Unit LIU) of a plurality of communications functions including a T1 channel service unit, a ringing generator, power converters, a ringback tone generator, and a channel bank controller. The LIU supports selectable T1 standards of communications. The invention solves telephone line interface, power filtering, ringing generation, and tone injection problems with lower component complexity, costs, and physical size than prior art solutions.

12 Claims, 22 Drawing Sheets

T1 CHANNEL BANK CONTROL AND APPARATUS

CROSS REFERENCED PATENTS

This application is a continuation of application number 08/781,485 filed Jan. 10, 1997, which was a divisional of application Ser. No. 08/440,099, filed May 12, 1995; related divisionals issued as U.S. Pat. No. 5,768,368 on Jun. 16, 1998, and U.S. Pat. No. 5,740,241 on April 1998.

FIELD OF INVENTION

The present invention relates to a single printed circuit board embodiment (Line Interface Unit LIU) of a plurality of communications functions including a T1 channel service unit, a ringing generator, power converters, a ringback tone generator, and a channel bank controller. The LIU supports selectable T1 standards of communications. Dual 12-channel telephone line voice cards plug into the LIU card to provide a complete T1 channel bank control process and apparatus.

BACKGROUND OF THE INVENTION

The two basic types of business systems are in common use. The Key Telephone System (KTS) serves small businesses where a few people need access to any one of several communication paths to a switching system. By using push buttons with indicator lights on the telephone instrument, the user can select an idle line to make a call. The user may also identify an incoming call on any of the lines and connect to that line to answer the call by operating the appropriate button. In FIG. 1, the ABC warehouse (8020) uses a key telephone system (8001). It is connected to a switching machine (not shown) in an end central office (8010) through a digital T1 line (8021). An Access Bank™ (the trademark for the present invention) channel bank (8002) converts the T1line to 12 or 24 loop-start dialog telephone lines (8022) that connect the Key Telephone System (8001). Since the warehouse telephone stations are operated by human beings, the communications path represents a human-to-machine interface and is called a KTS Line.

The second category of business system is known as a PBX or Private Branch Exchange. This is a switching machine, similar to those connecting subscribers or trunks in central offices. PBX's located on the subscriber premises are considered "branches", or subsidiaries of the central office switching system. They are "private" because they are dedicated to the business subscriber for the use of in-house personnel, instead of being shared with many business and residential users, like the switches in telco central offices. As indicated in FIG. 1, the ABC sales office (8023) and factory (8024) use PBX's (8011, 8008) for their business telephone systems. The communication path between the PBX's (8011, 8008) and their CO's (8004, 8010) are machine-to-machine interfaces, thus they are PBX trunks (8025, 8026) and require trunk circuits.

PBX trunks may be connected as many individual analog lines (8026) from a central office (8010). Alternatively, PBX trunks may be provided on a digital T1 line (8027) from the Central office (8004). An Access Bank™ channel bank (8005) is used to convert the T1 line to 12 or 24 groundstart telephone lines (8025) within, or near, the ABC Sales Office (8023). PBX stations are connected to the PBX switching machine, just like residential subscribers connect to the end CO switch, and are known as station lines. PBX station users can dial one another and be connected by the PBX switch. If a PBX user wishes to call a telephone located outside the company, the PBX switch selects an idle trunk over which the call is dialed, or in some cases a PBX attendant places the call using a special control box or turret (not shown), just like telephone operators used to do from their switch boards. Similarly, incoming calls over the CO trunks are received by the PBX switching system and extend to the desired station automatically or by an attendant.

Note that, unlike key telephone system users, the PBX station cannot select a particular trunk to answer or to initiate an outgoing call. The PBX switching system does that. However, as can be seen in the ABC Factory (8024) in addition to individual station lines, the PBX also serves a Key Telephone System (KTS) (8028). This provides the users within a department the convenience and features of the KTS (8028) in answering and making calls through the PBX switch. This arrangement is referred to as a key system installed "behind" a PBX. The communication path between PBX and KTS is a human-to-machine interface and is called a key system line.

Three types of special arrangements shown in FIG. 1 are popular in business communications. PBX users might want trunks to a central office which are not from the Co serving them. Such a transmission facility is known as a Foreign Exchange (FX) Trunk (8029). Companies might find it convenient to directly interconnect their PBX's at different locations without switching over shared public trunks. These arrangement are called tie trunks, and provide full period dedicated private circuits for interconnection. The ABC Sales Office (8023) and ABC Factory (8024) are connected by a digital T1 line (8036) to transmit the trunk circuits. Access Banks™ at the sales office (8034) and Factory (8035) serve to convert the T1line (8036) to 12 or 24 analog tie trunk circuit paths (8033).

There might be a need for PBX stations to be located at distant places, far removed from the premises where the business system serves the majority of the user personnel. Such arrangements can be engineered and treated just like any other station serving the PBX. This is known as an Off Premises Extension (OPX). A T1 line (8007) is used to carry off-premise extension channels from the Digital PBX (8008) to the Warehouse (8030). An Access Bank™ (8009) in the Warehouse converts the T1 line (8007) to 24 individual telephone connections (8031).

For providing residential telephone service, a T1 line (8012) is used to carry 24 telephone channels to a common point of distribution (8014). Only 4 wires (2 pairs) are used to connect this point to the Central office (8013) with a digital T1 line (8012), rather than 48 wires (24 pairs) required when using analog transmission. An Access Bank™ (8015) is used to convert the T1 line to 24 residential telephone lines (8037) at the point of distribution (8014).

PRIOR ART DISCUSSION

The primary prior art of powering a line or trunk circuit is shown in FIG. 10. −48 volt battery is fed through relay A to one winding of transformer T1 and to the Ring lead of the line or trunk. Ground is connected to relay A similarly and to the second winding of T1 and then to the Tip lead of the line or trunk. When there is a closed circuit between the Tip and Ring current flows through the windings of relay A in a series aiding manner, operating relay A and indicating that the circuit is in use. Current through the winding of T1 provides power to the telephone or trunk. Because several milliaperes is required to power a telephone set or indicate an operating trunk, the transformer T1 must be capable of carrying this current without saturating its magnetic core. The resultant size of transformers which will avoid saturation and have the necessary high inductance for good transmission quality are relatively large, heavy and costly. Current typical transformers for this purpose are about 1 cubic inch in size and weigh several ounces.

Technique for Improving Attentuation/Frequency Distortion and Return Loss (Impedance Matching) of Transformer-Coupled Wire-Line Communications Circuits by Using Secondary Series Capacitance and an AC Current Pump Signal Source.

The coupling of voice band and digital transmission systems to cable pairs exposed to lightning, static electric discharges and accidental connection to power sources typically utilize transformers. By using a transformer line coupling method, only the power supply of the communication system is exposed to the above hazards. These power supplies are ruggedly designed to self-protect and are also securely grounded.

The second requirement in coupling to a single cable pair in a full duplex voice system is to adequately separate the transmitted signal from the received signal. Failure to achieve at least 15 dB of separation results in objectionable or intolerable echoes to both ends of the system. Transformers and/or amplifying arrangements can achieve the needed separation. Such systems are known as transformer or electronic hybrid arrangements.

When space, weight and cost are not the primary requirements, a relatively large 4 or 6 winding transformer and suitable balancing network may be used. To prevent excessive loss of the voice band signal, the hybrid windings must be tightly coupled and to prevent saturation of the core by the DC line current a large core cross-section is required. Separation of incoming and outgoing signals of 30 decibels (signal power ratio) is typically achieved. FIG. 11 shows the transformer hybrid arrangement.

A second alternative is the use of a 2 winding transformer. The line current may be supplied as in FIG. 12, with amplifying arrangements can separate the incoming and ongoing signals.

The electronic hybrid arrangement of FIG. 12 requires that the Balance Network terminate the transmission line to prevent an echo back to the cable pair and to ensure that the voltage from the line driver amplifier can be effectively canceled in the subtracting circuit. The output of the subtracting circuit is the incoming signal with a minor residue of the outgoing signal.

The current competitive market for telephone equipment has placed a high priority on equipment size, weight and cost. The reduction of size and cost of the coupling transformer has become the focus of some systems. FIG. 13 shows the use of negative feedback from the line side of the transformer to improve the frequency response and control the output impedance of the driving amplifier. This arrangement is utilized in traditional high fidelity, sound systems. In this case, the miniaturized transformer utilizes a low inductance core which will not saturate when carrying the line current. The series resister R1 and the real and complex values of the feedback network also adjusts the phase and magnitude of the output of the Receive (REC) amplifier. The cancellation of the outgoing signal (receive) from the incoming signal (transmit) is accomplished in the summing circuit ($\Sigma$) at the input of the Xmt amplifier.

The above descriptions are examples of prior art. Injection of Real Time Tone Samples Into T1 Transmission Circuits By Use Of A T1 Framer Idle Code Register.

The use of digitized call-progress tones, supervision tones and recorded announcements into PCM bit streams extends from T1 carrier systems to personal computers. Typically, these systems use an adjunct device to multiplex the digital bit stream into the main data stream. In this new invention, an economy of components is achieved by utilizing the Idle Code Register of the T1 framer or T1 controller to insert a new tone sample in a dynamic fashion.

Generation of Ringing Voltage As Positive Voltage Pulses With Respect To A Negative Power Supply Voltage Prior art of ringing generators ranges from handcranked magnetics built into multipart, line telephones and small PBXs, DC motor-driven 20 Hz generators, sine wave oscillators coupled to high-power, high-voltage amplifiers, magnetic subharmonic generators driven by 60 Hz power and other arrangements of switches and capacitors. However the need for smaller, more efficient and less expensive generation of 20 Hz, 85 VRMS ringing sources persists.

Removal of AC Power Ripple By Using An Active Linear Floating Filter for the Purpose of Powering Telephone Line Circuits.

Conventional fixed voltage-regulated linear Subscriber Line Interface Circuits SLIC power sources dissipate a significant amount of power and require a means of dissipating the resultant heat. This is necessary to accommodate the typical range of ±20% voltage fluctuations from commercial power mains.

A second common solution is to rectify the 60 Hz power source, 50 Hz or use a switched power supply, employing pulsewidth modulation (PWM) to accomplish voltage regulation. Switched power supplies operate at high frequency and utilize high-frequency transformers to achieve the desired voltage levels and isolation from the power line and then use any of many rectification methods, to develop the DC voltage which is fed back to the control circuit for regulation of the PWM circuitry. This system prevents the heat generation of the fixed voltage-regulated power system but generates high-frequency signals which must be eliminated by filtering and shielding.

The new power filter circuit described here maintains a constant DC voltage drop and an AC voltage drop nearly equal and opposite to the ripple of the rectifier output.

The present invention solves telephone line interface, power filtering, ringing generation, and tone injection problems with lower component complexity, costs, and physical size than prior art solutions listed above.

GLOSSARY FROM ENTRIES

24th-Channel Signaling: Digital signal level-1 (DS1) signaling for which the signaling for each of the first 23 channels is multiplexed onto the 24th channel, thereby providing a full 64 kbps for user data on each of the first 23 channel. Also called clear-channel signaling. See also common-channel signaling and primary rate interface.

A/D Analog-to-Digital conversion: The process of encoding analog signals into digital signals.

AB bits Common label for in-band signaling bits on DS1 SF or 2-Mbit/s 31-channel (non-CAS) signals. See also signaling bits.

ACO Alarm Cut-Off: A switch or state that disables alarm outputs.

AIS Alarm Indication Signal: The AIS indicates a digital facility failure. Originally called a "Blue Signal". The AIS is an "all-ones" pattern.

AMI Alternate Mark Inversion: A line code in which a binary zero is represented by zero-voltage interval, and binary ones are represented by alternating positive and negative voltage pulses.

Analog Voice Terminals: An Analog voice terminal (telephone) receives acoustic voice signals and sends analog electrical signals along the line. These voice terminals are served by a signal wire pair (tip and ring). The Model 2500 telephone set is a typical example of an analog voice terminal.

Analog: The representation of information by means of continuously varying physical quantities such as amplitude, frequency, phase, or resistance.

Automatic Number Identification (ANI) [T1.104-1988]: ANI provides the billing number of the line or trunk that originated a call.

BE8ZS (bipolar with 8-zero substitution) [T1.401-1989]: A code in which eight consecutive "zeros" are replaced with the sequence 000+−0−+ if the preceding pulse was +, and with the sequence 000−+0+− if the preceding pulse was −, where + represents a positive pulse, − represents a negative pulse, and 0 represents no pulse.

Bandwidth: The difference, expressed in hertz, between the highest and lowest frequencies in a range of frequencies that determine channel capacity.

Bipolar (alternate mark inversion) signal [T1.403-1989]: A pseudoternary signal, conveying binary digits, in which successive "ones" (marks, pulses) are of alternating, positive (+) and negative (−) polarity, equal in amplitude, and in which a "zero" (space, no pulse) is of zero amplitude.

Bipolar Signal: A digital signal that uses either a positive or negative excursion, usually alternating, for one state and ground for the other.

Bipolar Violation (BPV) The occurrence of a pulse that breaks the alternating pulse polarity rule. BPV measurements do not include pulses violated by zero substitution codes.

Bipolar Violation [T1.403-1989]: In bipolar signal, a one (mark, pulse) which has the same polarity as its predecessor.

Bit (binary digit): One unit of information in binary notation, having two possible states or values: 0 or 1.

Bit Period (T) [T1.106-1988]: The amount of time required to transmit a logical one or a logical zero.

Bit Rate: The speed at which bits are transmitted, usually expressed in bits per second. Also called data rate. See also baud and bits per second.

Bits Per Second (bps): The number of binary units of information that are transmitted or received per second. See also baud and bit rate.

BPS: See bits per second.

Byte: A sequence of (usually eight) bits processed together.

C-Message (CMSG) In analog measurements, a specific filter that measures signal noise in a standard telephone subscriber environment.

Central Office (CO) The location of telephone switching equipment that provides local telephone service and access to toll facilities for long-distance calling. More than one CO can serve the same area.

Central Office (CO) Trunk: A telecommunications channel that provides access from a PBX to the public network through the local central office.

Channel Bank: Terminal equipment for a transmission system used to multiplex individual channels using frequency-division multiplexing (FDM) or time-division multiplexing (TDM).

Channel: A telecommunications transmission path for voice and/or data.

Circuit: 1. An arrangement of electrical elements through which electric current flows, providing one or more specific function. 2. A channel or transmission path between two or more points.

CO: See central office.

Communications System: The software-controlled processor complex that interprets dialing pulses, tones, and/or keyboard characters and makes the proper interconnections both within the system and external to the system. The communications system itself consists of a digital computer, software, storage device, and carriers with special hardware to perform the actual connections. A communications system provides voice and/or data communication services, including access to public and private networks, for telephones and data terminals on a customer's premises. See also switch.

CPE: See class of service.

CSU Channel Service Unit: Equipment at customer premises that terminates digital circuits, and provides testing functions.

CSU: See central processing unit.

Customer Provided (premises) equipment (CPE): Customer owned equipment that is not provided as part of the system but is to be connected to it.

Customer Service Unit (CSU): See network channel terminating equipment.

Cyclic Redundancy Check (CRC) [T1.403-1989]: A method of checking the integrity of received data, where the check uses a polynomial algorithm based on the content of the data.

D/A Digital-to-Analog conversion: The process of decoding analog signals from digital signals.

D4 The common name for DS1 SuperFrame format. See also Super-Frame Format.

D4 Framing Format: A format containing 12 frames. See also extended frame and frame.

DACS Digital Access and Cross-connected System. See also Digital Cross-connect System.

Data Rate: See bit rate.

dBDSX, dBdsx Decibels relative to the nominal DSX signal level. See decibel.

dBm Decibels relative to one milliwatt (1 mW). See also decibel.

Dedicated Line: Also known as a private or leased line. It is for the exclusive use of the leasing party.

Demultiplexer: A device used to separate two are more signals that were previously combined by a compatible multiplexer and transmitted over a single channel.

Digital Circuit [T1.206-1988]: A combination of two digital transmission channels permitting bi-directional digital transmission in both directions between two points, to support a single communication.

Digital Data: Data represented in discrete, discontinuous form, usually binary. This is in contrast to continuous analog data, usually represented in sine wave form.

Digital Exchange [T1.206-1988]: An exchange that switched digital signals by means of digital switching.

Digital Loopback [T1.206-1988]: A mechanism incorporated into a terminal or into the network whereby a duplex communication path my be connected back upon itself so that the digits sent on the transmit path are returned on the receive path.

Digital Path [T1.206-1988]: The whole of the means of transmitting and receiving a digital signal of specified rate between the two digital distribution frames (or equivalent) at which terminal equipments or digital exchanges will be connected.

Digital Signal, Level n (Dsn) [T1.101-1987]: Digital signal level in the transmission hierarchy. Bit rates at each level are as follows:

| Level | Bit Rate |
|---|---|
| 0 | 64 kb/s |
| 1 | 1.544 Mb/s |
| 2 | 6.312 Mb/s |
| 3 | 44.736 Mb/s |

Digital Signal Cross Connect, Level n (DSX-n) [T1.101-1987]: Convenient central point for cross-connecting, rearranging, patching and testing digital and testing digital equipment and facilities at the Dsn level.

Digital Transmission: A mode of transmission in which the information to be transmitted is first converted to digital form and then transmitted as a serial stream of pulses.

Digital: The representation of information in discrete elements such as off and on or 0 or 1.

Direct Distance Dialing (DDD): The capability of completing long-distance calls without operator assistance. Direct Inward Dialing A feature that allows an incoming call from the public network (not FX or WATS) to reach a specific telephone without attendant assistance. DID calls to DID-restricted telephone lines are routed to an attendant or recorded announcement, depending on the option selected.

Disconnect Signal [T1.104-1988]: An on-hook signal indicating the connection is being cleared. It is initiated by the disconnect-control office (except under maintenance conditions) and is repeated through the trunks composing an established connection. The signal responding to a disconnect signal, but applied in the direction opposite to the direction of propagation of the disconnect signal, may also be considered a disconnect signal.

DS1 Digital Signal level 1: 1.544 Mbit/s; also called "T1" (24 DSO channels).

DS1 (digital signal level 1) [T1.403-1989]: A digital signal transmitted at the nominal rate of 1.544 Mbit/s.

DS1: See digital signal level 1.

DS1: Robbed-Bit Signaling See robbed-bit signaling.

DSO Digital Signal level 0: typically 64 kbit/s to 56 kbit/s. DSO may also refer to an individual channel in a DS1 or higher rate signal.

DSO×N DSO times N: refers to a signal composed of N number of DSOs. The signal's rate is determined by multiplying the number of DSOs by the rate of a single DSO. Example: a DSO×4 signal, where one DSO is 64 kbit/s would form a 64×4, or 256 kbit/s signal. See also DSO and N×64.

E&M E-Lead and M-Lead: two of the leads in a six wire telephone circuit. Also refers to a supervisory signaling scheme with register digits and codes conveyed on these leads.

Exchange Carrier (EC) [T1.104-1988]: A carrier authorized to proved telecommunication services within one or more access service areas.

Exchange Carrier (EC) [T1.502-1988]: The telecommunications common carrier franchised to provide telecommunications services within one or more exchanges. An EX may also provide exchange access service, intra-LATA longdistance service, and in some unusual cases, interLATA service.

Extended Superframe (Fe) Framing Format: A format of 24 frames. See also frame.

Facility: The equipment constituting a telecommunications transmission path. See also line and trunk.

Foreign Exchange (FX): See FX.

Format Structure [T1-201-1987] [T1.205-1988]: A combination of two or more data elements grouped in a prescribed sequence.

Fractional T1 (FT1) Referring to sub-rate signals composed of several channels within a T1 (DS1) signal. The rate of an FT1 signal is determined by multiplying the number of selected channels (DSOs) by the DSO base rate.

Frame: One of several segments of an analog or digital signal that has a repetitive characteristic. For example, in a time division multiplexed (TDM) system, a frame is a sequence of time slots, each containing a sample from one of the channels served by the multiplex system. The frame is repeated at the sampling rate, and each channel occupies the same sequence position in successive frames. See also D$ framing format and extended superframe framing format.

Full-Duplex Transmission: A transmission system capable of carrying signals in both directions simultaneously.

FX (foreign exchange): A central office (CO) other than the one providing local access to the public network.

FX Trunk: A telecommunications facility that connects a communications system to a central office (CO) other than its own.

Glare: The simultaneous seizure of a two-way trunk by two communications systems, resulting in a standoff.

Hand-Up Signal [T1.104-1988]: An on-hook signal sent from an end office toward the disconnect-control office indicating either calling or called user hang-up and requesting the connection be disconnected. The interface remains dedicated to the call until the disconnect-control office responds to the hand-up signal. Hang-Up [T.1.104.1988] Calling or called user placement of a telephone set or other unit of telecommunications equipment in the quiescent state.

Hz Hertz: A frequency measurement that indicates the number of cycles which pass a specific point per second. One Hertz equals one cycle per second.

impedance: The effect of resistance, inductance, and capacitance on a transmitted signal. Expressed in ohms (Ω)

In-Band [T1.403-1989]: Using or involving the information digit time slots of a DS1 frame; i.e., bit assignments of a frame exclusive of the framing bit.

Inband Signaling: Signals transmitted within the same channel and frequency bank used for message traffic. See also robbed-bit signaling.

Interface: A common boundary between two systems or pieces of equipment.

isochronous: Recurring at regular intervals. A signal is said to be isochronous if the time interval separating any two significant instants is theoretically equal to the unit interval, or to a multiple of the unit interval.

Jitter [T1.403-1989]: Short-term variation of the significant instants of a digital signal from their ideal positions in time. Short-term implies that these variations are high frequency (greater than 10 Hz).

Kilo Bits Per Second (kbps): 1000 bits per second.

LBO Line Build Out: A cable simulation circuit designed to reproduce the signal attenuation of a specific length of cable.

LBS Least Significant Bit: The position within a byte that has the smallest value.

LED (light emitting diode): A semiconductor device that produces light when voltage is applied. LED's provide a visual indication of the operational status of hardware components, the results of maintenance tests, and the alarm status of circuit packs, and the activation of telephone features.

Line Alarm Indication Signal (AIS) Code [T1.105-1988]: A Line AIS code is generated by a regenerator upon loss of input signal or loss of frame. The Line AIS signal will maintain operation of the downstream regenerators and therefore prevent generation of unnecessary alarms. At the same time, data and orderwire communication is retained between the regenerators and the downstream Line Terminating Equipment (LTE).

line code A system of pulses that represents data during transmission. For examples see AMI, BNZS. Line Loopback [T1.403.1989]: A loopback in which the signal transmitted beyond the loopback point (the forward signal), when the loopback is activated, is the same as the received signal at the loopback point.

LLB Line Loop Back: A signal path timing mode in which a signal is retransmitted exactly as it is received by the terminal equipment.

LOC Loss of Carrier: a condition of having no information bearing signal.

Local Access and Transport Area (LATA) [T1.502-1988]: A geographic area established for the provision and administration of telecommunications services. A LATA encompasses one or more exchanges that have been grouped to serve common social, economic, and other purposes.

Local Exchange Company (LEC): A company franchised to provide public intra-LATA (local access and transport area) telephone service to subscribers within a defined geographical area. Also called a local exchange carrier or local telephone company.

LOF Loss of Frame: An extended period of the Out of Frame (OOF) state. See also OOF.

Longitudinally Balanced [T1.505-1989]: The longitudinal-to-metallic (s-to-m) balance coefficient is expressed as:

Longitudinal Balance (dB)=20 log |Vs/Vm|, Where Vs is the longitudinally applied voltage, Vm is the resulting metallic voltage produced by the imbalance of the interface connection. The expected values are:

| Frequency Range | Standard Value |
|---|---|
| 20 to 250 Hz | >72 dB |
| 251 to 7,000 Hz | >66 dB |
| 7,001 to 20,000 Hz | >60 dB | loop activate: A code that, when sent to a remote piece of equipment such as CSU, causes the equipment to go into a loopback condition.

loop code: A specific bit sequence, or code, that tells a far-end piece of equipment such as a CSU to activate or deactivate its loopback mode. See also loopback.

loop deactivate: A code that, when send to a remote piece of equipment such as a CSU, causes the equipment to go cancel any existing loopback condition.

loop down: See loop deactivate.

loop timing: A signal path and timing mode in which the transmitted data is generated or regenerated by the terminal equipment, but the transmit timing is derived from the input signal.

Loopback [T1.403-1989]: A state of a transmission facility in which the received signal is returned towards the sender.

LOS Loss of Signal: a state declared when there is no detectable signal which meets specified parameters.

Mbit/s, Mbs: Notation for "megabits per second" Standard unit of measure for transmission rate. Alternate form: "Mbs." See also megabit.

Mhz Megahertz: One million Hertz, or one-million cycles per second. See also Hz.

Modem: A device that converts digital data signals to analog signals for transmission over telephone circuits. The analog signals are converted back to the original digital data signals by another modem at the other end of the circuit.

Most significant Bit [T1.502-1988]: The leftmost bit position. Bit 1 as illustrated in FIG. 3, page 37 of designated document.

MU-255: A type of code by chic analog signals are encoded to digital signals.

multiframe: A set of consecutive frames in which the position of each frame can be identified by reference to a multiframe alignment signal.

multiplexer (mux): Technically, a device that performs multiplexing. However, common usage has broadened the definition to include devises that perform both multiplexing and demultiplexing. See also muldem.

Multiplexer: A device used to combine a number of individual channels into a common bit stream for transmission.

Multiplexing: A process whereby a transmission facility is divided into two ore more channels, either by splitting the frequency band into a number of narrower bands or by dividing the transmission channel into successive time slots. See also time-division multiplexing.

multiplexing: The process of combining multiple signals into a single, higher rate signal for more efficient transmission. Compare with demultiplexing. See also multiplexer and muldem.

mux: See multiplexer.

mV: Notation for "millivolt:" one thousandth of a volt.

mW: Notation for a "milliwatt:" one thousandth of a watt.

Network [T1.403-1989]: A collection of transmission and switching facilities used to establish communication channels.

Octet [T1.206-1988]: A group of eight binary digits operated upon as an entity.

Off Premises: Telephones or data terminals that are not located within the same building or campus as a communications system or have loop lengths greater than 3500 feet.

Off-Hook: A condition in which the handset of a telephone is off the switchhook or the telephone is activated by other means, such as through a speakerphone button.

one: A binary digit, represented digitally by a non-zero pulse. Also called a mark. See also bit.

OOF Out of Frame: also called "Out of Frame Synchronization:" A state in which the digital terminal or test set cannot detect a valid frame alignment sequence.

PABX Private Automatic Branch Exchange: see PBX.

Parity: A method of checking and, in some cases, correcting the accuracy of bits.

Pattern: For Automatic Alternate Routing—Automatic Route Selection (AAR-ARS), a series of trunk groups arranged in a preferential order. Also called routing pattern.

PCM Pulse Code Modulation: The sampling of an analog signal into a binary code to be digitally transmitted. Common speech digitizing uses 8-bit samples and a sample rate of 8 kHz.

Physical Layer [T1.110-1987]: The layer (Layer 1) that provides transparent transmission of a bit stream over a circuit built from some physical communications medium.

plesiochronous: Closely matched in time or frequency: Two signals are plesiochronous if their corresponding significant instants occur at nominally the same rate. For example: two signals having the same bit rate but whose timing comes from separate clocks may be considered.

Private Branch Exchange: See PBX.

protocol: In telecommunications, a formal set of conventions governing the format and relative timing of message exchange between communication processes.

PSTN Public Switched Telephone Network: Any common carrier network that provides circuit switching between public users.

Public Network: A network that is commonly accessible for local or long-distance calling.

Pulse Density [T1.403-1989]: A measure of the number of "ones" (marks, pulses) in relation to the total number of digit time slots transmitted.

Pulse-code Modulation: An extension of pulse-amplitude modulation (PAM) in which carrier signal pulses modulated by an analog signal, such as speech, are quantized and encoded to a digital, usually binary, format. See also pulses-amplitude modulation.

Quasi-Random Signal (QRS) [T1.201-1989]: A signal consisting of a bit sequence that approximates a random signal.

RBS Robbed Bit Signaling: In PCM, a scheme in which the signaling bits for each channel are assigned to the LSB (Bit 8) or Frames 11 and 12 SF format, or Frames 6,12,18, and 24 in ESF format.

Red alarm: Indicates a local failure of a carrier system in the receive, or near-to-far, direction. Also called a "local alarm."

Remote alarm: a Yellow alarm (see also Yellow alarm).

Robbed-Bit Signaling: Digital signal level-1 (DS1) signaling in which up to eight kbps from each of the 24 64 kbps channels are used for signaling in every sixth frame. The least significant bit of each 8-bit sample is replaced by a signaling bit. Also called DS1 robbed-bit signaling.

signaling bits: Overhead (or robbed) bits that carry dialing and control information on a signal.

slip: The occurrence of a digital signal buffer overflow or underflow in a synchronous digital network. See also controlled slip and uncontrolled slip.

SuperFrame Format (SF, D4): A framing format which allows for 24 channels on a DS1 signal. Also called "D4."

Switch: Any kind of telephone switching system. See also communications system and ESS.

synchronization: The state or action of having a common rate (frequency): Two or more signals are synchronized if they run at the same clock rate.

Synchronous [T1.105-1988]: The essential characteristic of time-scales or signals such that their corresponding significant instants occur at precisely the same average rate.

T1 Digital Carrier: A type of digital transmission medium that transmits at 1.544 Mbps and is capable of carrying 24 channels.

T1 Line [T1.403-1989]: A full duplex digital transmission facility that is composed of two twisted metallic parts and regenerators that carry one DS1 signal.

T1: A digital transmission standard that in North America carries traffic at the digital signal level-1 (DS1) rate of 1.544 Mbps.

T1: The common expression for DS1 (see also DS1). "T1" also refers to the actual cables or media that carry the DS1 signal.

Test pattern: A known, non-random bit sequence used for testing end-to-end or round-trip performance. A received test pattern can be compared to the transmitted test pattern to determine if any errors have occurred.

Tie Trunk: A dedicated telecommunications channel connecting two private communications systems. Also called automatic tie trunk.

Tip and Ring: Tip and ring are common nomenclature derived from old cord switchboard technology to differentiate between the two leads of an analog line or trunk.

Trunk: A dedicated telecommunications channel between two communications systems or central offices (CO's). See also facility.

Twisted Pair: Two copper wires used for the transmission of voice and/or data.

VF Voice Frequency: Describing an analog signal with a frequency lying within the part of the audio range reserved for speech transmission, approximately 200 to 3500 Hz.

Wander [T1.403-1989]: Long-term variations of the significant instants of a digital signal from their ideal positions in time. Long-term implies that these variations are of low frequency (less than 10 Hz).

Wink: A return pulse that acknowledges a line seizure or other line event before the transmission or reception of dial pulse digits or other calling information.

Yellow alarm: Also called a "Remote alarm", a Yellow alarm indicates a one-directional failure in the transmit or near-to-far direction.

Zero A binary digit: Also called a "space": See also bit.

SUMMARY OF THE INVENTION

The primary object of the present invention is to provide a reliable and simplified T1 channel bank control process and apparatus using minimal circuit components.

Another object of the present invention is to provide "battery feed" using a small transformer to analog or digital telephone lines for the purpose of powering terminating equipment or interfaces at the far end of a wire line. Applications are in wire-line telephony such as central office or exchange subscriber lines, multiplexing equipment, and Foreign Exchange Station (FXS) equipment. Very small, low-power, telephone Subscriber Line Interface Circuits (SLIC's) may be constructed using the new technique. Line currents are provided from current regulators that do not feed through an AC coupling device, such as a transformer. The technique provides excellent Longitudinal-to-Metallic balance when measured to standards such as FCC Part 68, IEEE Standard 455-1976, and AT&T TR43801. Longitudinal balance is required of telephone line feeding circuits to avoid the pick-up of induced noise sources, such as power line "hum", in wireline communications circuits. The technique also limits the amount of current supplied to telephone lines, thereby decreasing power consumption and heat dissipation in the communications systems.

A DC voltage power source has an output current regulator and an input current regulator. These two current regulators connect to the wire line loop which connects to the remote telephone equipment. Each regulator is set to approximately the same current, thereby creating an error current as the difference between the two current settings. A capacitor is used to couple the wire line loop to the AC coupling device which in turn connects to the telephone line. This circuit arrangement creates excellent longitudinal balance performance and immunity to induced noise sources such as the AC coupling device hum.

Another object of the present invention is to provide a technique for improving attenuation/frequency distortion and return loss (impedance matching) of transformer-coupled wireline communications circuits by using secondary series capacitance and an AC current-pump signal source.

This electronic technique is used for coupling AC communications signals to analog or digital telephone lines. Applications are in wire-line telephony such as central office or exchange subscriber lines, multiplexing equipment, and Foreign Exchange Station (FXS) equipment. Very small, low-cost, telephone Subscriber Line Interface Circuits (SLIC's) may be constructed by using an AC coupling transformer that is small in size and relatively low in magnetic inductance, in comparison to traditional techniques.

The technique compensates for a low value of transformer inductance by using a series capacitance in the secondary side of a transformer circuit. The capacitor allow the total circuit to maintain a constant matching impedance (Zm) as a function of frequency. This results in significant improvement in Return Loss (minimization of reflected signals) in comparison to circuits with no secondary capacitance compensation.

In addition to the secondary capacitance used for impedance compensation, a voltage-controlled AC current pump is used to drive the communications signal into the secondary side of the transformer circuit. The current pump serves to compensate for the effect of the small transformer inductance and low coupling efficiency that would otherwise decrease the amplitude of low frequency signals with respect to the amplitude of high frequency signals. The technique avoids an impairment in signal gain as a function of frequency, commonly called Attenuation/Frequency Distortion.

The AC current pump is constructed to automatically charge its drive voltage to maintain a constant total AC drive current. To compensate for the reduction of the transformer impedance $Z_s$ value of the series capacitor C is chosen to series resonate with the transformer secondary. The resonance reduces the impedance of the transformer branch, increasing the current through that branch, maintaining an overall flat circuit loss for the communications signal as a function of frequency.

Because the AC current pump presents a very high impedance to signals originating from the wire line, the termination impedance of the circuit can be adjusted to match the wire line or connected communications equipment independently of the signal source impedance.

Another object of the present invention is to provide for the generation of ringing voltage as positive voltage pulses with respect to a negative power supply voltage.

A modern circuit for the purpose of operating a telephone must meet a wide range of safety and performance criteria. Standards call for the generation of relatively high voltage pulses to operate electromechanical devices such as bells. Commonly-provided ringing signals in North America have a voltage of 85 Vrms and a frequency of 20 Hz. Factors affecting the design of a circuit meeting these standards are:

A. Crest Factor—Ringing pulses must be shaped to a range of "crest-factor", the peak waveform value relative to the rms value should be between 1.2 to 1.6.

B. Output Impedance—The source must present relatively high output impedance (about 1400 ohms), for reasons of safety.

C. Ringing Pulse Frequency—The frequency of pulses presented to the telephone may range from a low of 12 pulses per second to a high of 33 pulses per second.

D. Alerting Device Load—Telephone bells or alerting devices are typically capacitively coupled across the tip and ring conductors of phone lines. The impedance load presented to the ringing voltage generator may only be as high as tens of thousands of ohms, to as low as 1400 ohms. The load presented to the ringing generator may be highly reactive, and the effects of these loads must be accounted for.

E. Peak Voltage Maximum The voltage may not peak over 200 volts.

F. Momentary Short Circuits—Logic dictates that the circuit be capable of withstanding a short circuit across its output terminals.

G. Telephone Hook Switch Detection—Loop current sensing circuitry must detect when the telephone is answered. In order to do this the circuit must operate at negative telephone battery, below ground. This is to allow loop current sensing circuitry to detect off-hook of a telephone, even during cadence off (when ringing voltage is not present), or when an off-hook is detected during cadence on when ringing voltage B presents.

H. Noise and Electromagnetic Compatibility Issues When a telephone is answered, a noise inducing current pulse may be generated. This pulse, if not attenuated will be picked up in adjacent telephone lines. This is because the ringing voltage generator load is no longer only the bell, or similar device, but the relatively low impedance of the telephone circuit itself (which may be in the 50 to 300 ohm resistive range). While generating these pulses there must not be enough Radio Frequency radiation to cause the system using the ringing circuit to fail FCC Part 15 radiation levels.

I. System Reliability in the Presence of Circuit Failure—Should some component of the Ringing Pulse voltage generator fail, the circuit should not draw sufficient current to cause the rest of the system to fail. A circuit failure generating excessive peak voltage must not be allowed to place excessive voltage on the generator output, nor may that failure cause successive failures of down stream circuitry.

J. The voltage out of the ringing generator must be about 86 volts rms, over a specified load. The technique of this invention uses a push-pull switching voltage regulator circuit (FIG. 5) switch on and off at the desired ringing voltage pulse rate. The ringing voltage pulse rate is governed solely by a digital frequency generator. The voltage regulator is turned on and off by the digital frequency generator's output. This frequency may be varied over the needed range by adjusting frequency controlling elements. The output of the digital frequency generator is also fed to a switch (S1) on the output of the regulator. The operation of this switch is such that when the voltage regulator is on, the switch is open. When the regulator is not generating voltage, the switch is closed, discharging any capacitance across the output terminals.

A push-pull switching voltage regulator operates at a frequency thousands of times that of the ringing voltage pulse rate. Two output switches are alternately operated Open and Closed to apply an alternating high frequency current through a small transformer. The voltage applied across the transformer's primary winding is multiplied by the turns ratio of the transformer, which boosts the circuit's supply voltage by many times. The transformer is wound to provide the proper output impedance for the circuit, under maximum load conditions.

A voltage divider feed back circuit incorporated into a pulse width regulator circuit causes the voltage to be limited to approximately 180 volts peak, (or approximately 86 volts rms). The waveform is a shaped rectangular wave at the desired ringing pulse frequency.

The push pull circuit technique is used to minimize the RF radiation from the high frequency switching circuit. The voltage doubler action of the push-pull circuit also tends to minimize transformer turns ratios, improving the efficiency of the circuit.

Circuit overload protection is provided by a current sensor, operating in concert with the Pulse Integrator circuit. Each output pulse has approximately the same peak current level. The current sensor applies a voltage proportional to the width and amplitude of the peak current to the pulse integrator. If a sufficient quantity of pulses are applied to the integrator in a time period, the over current shutdown function of the circuit will limit the quantity of pulses output. When the over load condition is removed, the circuit operation will return to normal, and the dc output of the pulse integrator circuit will return to a non-current limiting level.

If the differentiator and voltage feedback circuit were to open, excessive voltage would appear at the generator's output terminals. An overvoltage protector will short to a very low impedance within a few microseconds of detection of the voltage being over approximately 240 volts. This will lower the output voltage to only a few volts over the negative voltage supply to the circuit.

Another object of the present invention is to provide for the removal of AC power ripple by using an active linear floating filter for the purpose of powering telephone line circuits.

This electronic technique attenuates AC ripple voltages from rectified transformer power supplies by factors up to 100, without the use of large capacitances. Unlike conventional fixed voltage linear regulators, the output voltage of the circuit floats with respect to the absolute value of the rectified AC input source. That is, a 10% increase in the input source will produce approximately a 10% increase in the output voltage. Conventional fixed voltage linear regulator power supplies produce an output voltage that remains the same, regardless of input source changes.

The purpose of this new circuit is to provide a filtered DC voltage for powering telephone Subscriber Line Interface Circuits (SLICs). One function of SLICs is to provide a DC line current to terminating equipment at the other end of the line, for example telephone sets. The DC line current must be substantially free from AC noise sources, such as 50 or 60 Hz ripple, that would be heard by telephone users. By selecting a SLIC circuit with a reasonably wide input voltage range, this new technique provides noise-free current to the telephone line without large component size, cost, and power dissipation inherent in using a fixed voltage-regulated power source.

Conventional fixed voltage-regulated linear SLIC power sources dissipate a significant amount of power and heat. This is necessary to accommodate the typical range of plus or minus 20% input voltage fluctuations from commercial power mains and step-down transformers. The new power filter circuit described here maintains a constant DC voltage drop rather than a constant DC voltage output.

Still another object of the present invention is to provide for the injection of real time tone samples into T1 transmission circuits by use of a T1 framer idle code register.

This software technique is used to insert Pulse Code Modulation (PCM) tone samples into a T1 digital time division (TDM) multiplex transmission line at an 8 kHz rate. This technique makes use of the Idle Code Register commonly incorporated in T1 Framer or T1 Controller integrated circuits to insert a new tone sample into one or more of the 24 channel time slots of a T1 frame in real-time. The Idle Code Register function of such integrated circuits is designed and documented for the purpose of inserting a constant or quiet (idle) PCM sample in one or more channels of the T1 frame. Dynamic (8 kHz) updates of the Idle Code Register for the purposes of digital tone generation are undocumented to date.

By updating the PCM tone sample from a table of values at every frame pulse (occurring every 125 us), simple sinusoidal or complex multi-frequency (such as ringback tone) digital tone generation is accomplished. This software tone generation technique makes use of a microcomputer to write a new tone sample to a single Idle Code Register of a T1 Framer or Controller in synchronization with the frame pulse of the T1. Unlike other techniques, no electronic memory buffer or dedicated register file is used to store and update the PCM tone samples. The T1 Framer or Controller integrated circuit inserts the Idle Code Register value in the T1 stream at any or all of the 24 channels that have been marked to receive the Idle Code in place of PCM samples coming from other sources in the communications system. Tone generation is thus done by real-time microcomputer software updates and the Idle Code substitution capabilities of the T1 Framer or Controller integrated circuit.

Revolutionary Integration

The present invention sets a new standard for connecting T1 switched services to Hybrid/Key and PBX telephone systems. The present invention known as the Access Bank™ converts a T1 digital access line to 12 or 24 individual analog telephone circuits. The Access Bank™ provides the most economical, compact, and reliable solution on the market for converting T1 digital access services from AT&T, LDDS, MCI, Sprint, and local telephone companies to standard "dial tone" interfaces. Business and government offices can connect their existing telephone systems to T1 digital services—without a significant investment in equipment.

Using state-of-the-art solid state integrated circuits, ultra-reliability and advanced service features have been engineered into the Access Bank™. Only three circuit cards make up a complete 24 channel bank. The FCC-registered T1 Channel Service Unit (CSU), Ringing Generator, Power Converters, Ringback Tone Generator, and Channel Bank Controller are all integrated into a single small electronics card called the Line Interface Unit (LIU). The LIU connects directly to carrier T1 lines and supports selectable T1 standards of D4 or ESF framing and AMI or B8ZS line coding. A quick field replacement of the LIU completely changes all common electronics in the Access Bank™.

Intelligent Compatibility

One or two 12 channel telephone line voice cards plug into the LIU card to make a complete Access Bank™. The most commonly used 12-channel voice card is the FXS-12. One FXS-12 card provides 12 standard Loop Start or Ground Start telephone line connections to a customers telephone system. The second FXS-12 card (for 24 telephone lines total) can be added to the Access Bank™ simply by sliding it into the back of the cabinet. The FXS-12 cards contain their own intelligent microcontrollers, providing the following signaling conversions (selectable) for major carrier T1 services:

Standard FXS Loop and Ground Start signaling for MCI, Sprint, LDDS, and most local telephone operating companies.

E&M Wink Signaling on the T1 line can optionally be converted to a standard Group Start or Loop Start connection to a customer's telephone system, for example AT&T Megacom® (ringback tone provided by the Access Bank™).

Nynex FlexPath® (with ringback tone provided by the Access Bank™).

Options for the delivery of Automatic Number Identification (ANI) and Directory Number Identification (DNIS) 800 services are built in.

New Standards of Service, Safety, and Support

In addition to dramatic functional integration and economy—the Access Bank™ incorporates several new innovations in channel bank and multiplexer design:

A front-panel Self Test Switch automatically disconnects the Access Bank™ from the T1 line and performs a self diagnostic test. When Self Test is activated, each FXS channel also provides an internally-generated ringback tone to the telephone line. This feature, plus a ringing output test for each channel, verifies channel functionality independently of the T1 line or remote-end switch conditions.

Solid state lightning and overcurrent protection are sued on all voice lines and the T1 line. The Access Bank™ complies with National Electrical Code and UL 1459 requirements for the safety of equipment attached to telephone wiring. All line attachments withstand 600 Vrms power connections without fire hazard. Using new electronic technology, the Access Bank™ obtains safety compliance without any fuses—dramatically improving long-term reliability.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
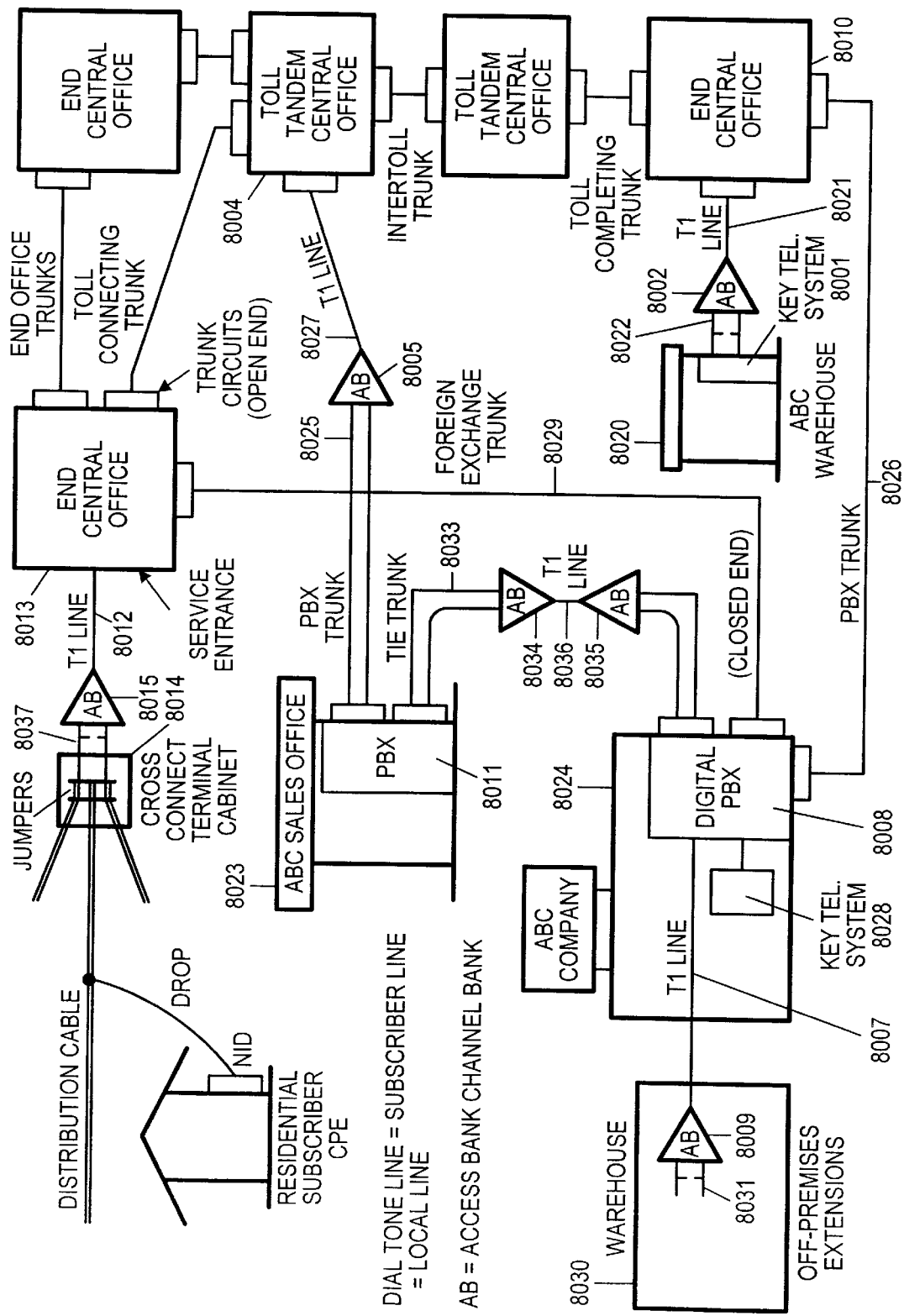
FIG. 1 is a schematic of a communications network having the present invention as one component.
Figure 2:
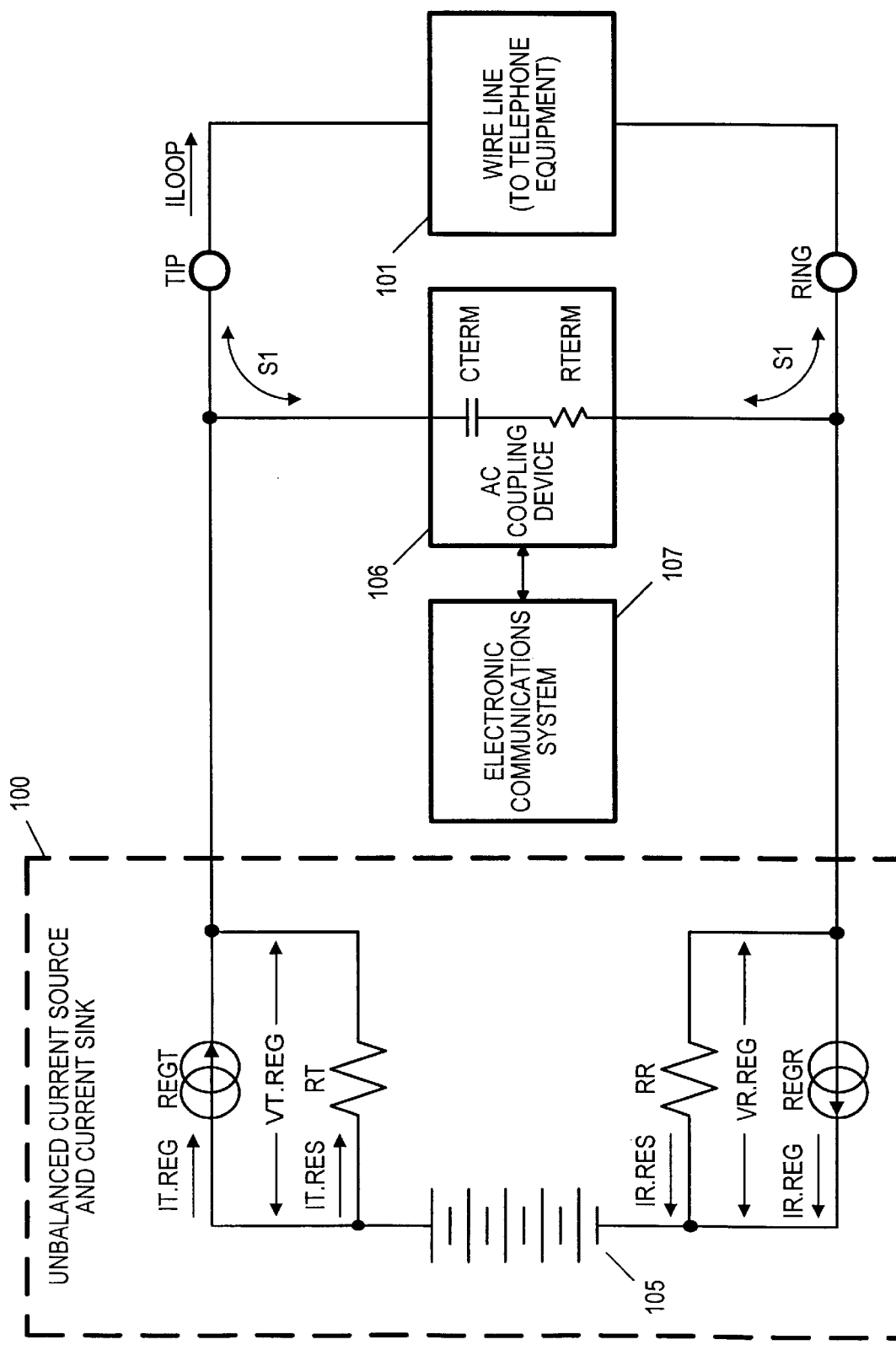
FIG. 2 is a circuit diagram of a telephone Subscriber Line Interface Circuit having an unbalanced current source and current sink.
Figure 3A:
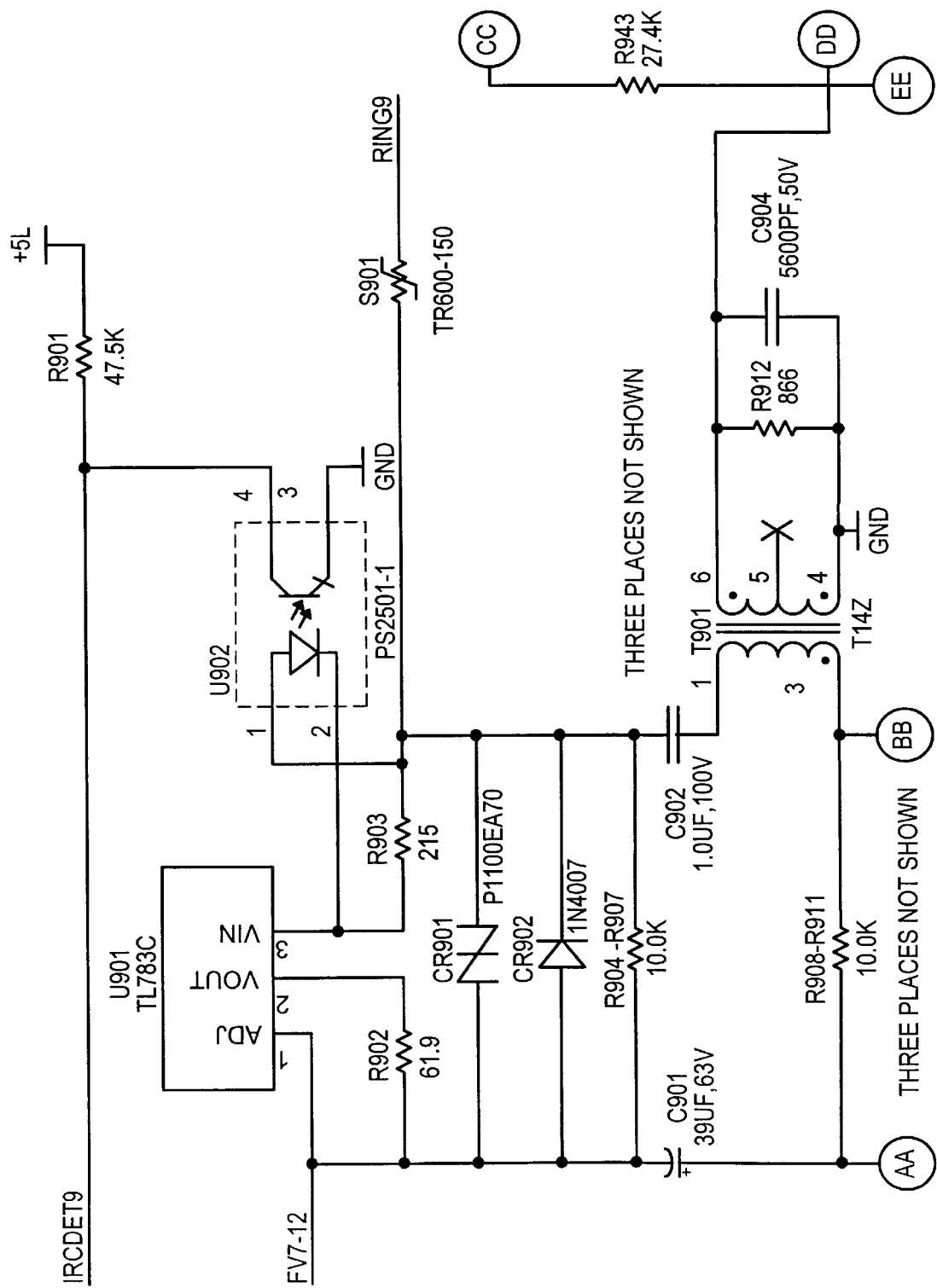
FIGS. 3A,3B,3C,3D,3E illustrate a circuit diagram of a transformer, coupled wire line communication circuit having a secondary capacitance and an AC current pump signal source.
Figure 3B:
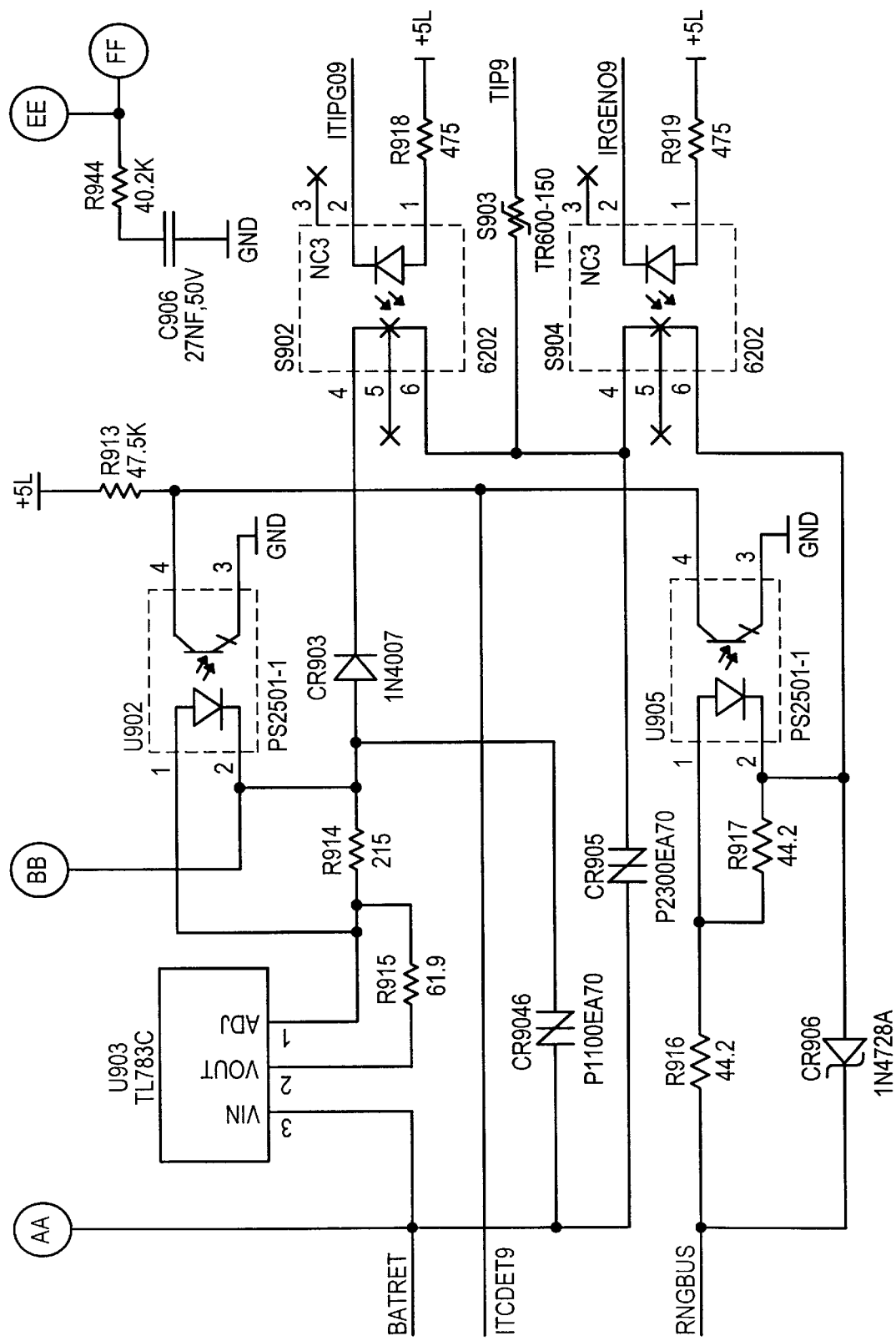
Figure 3C:
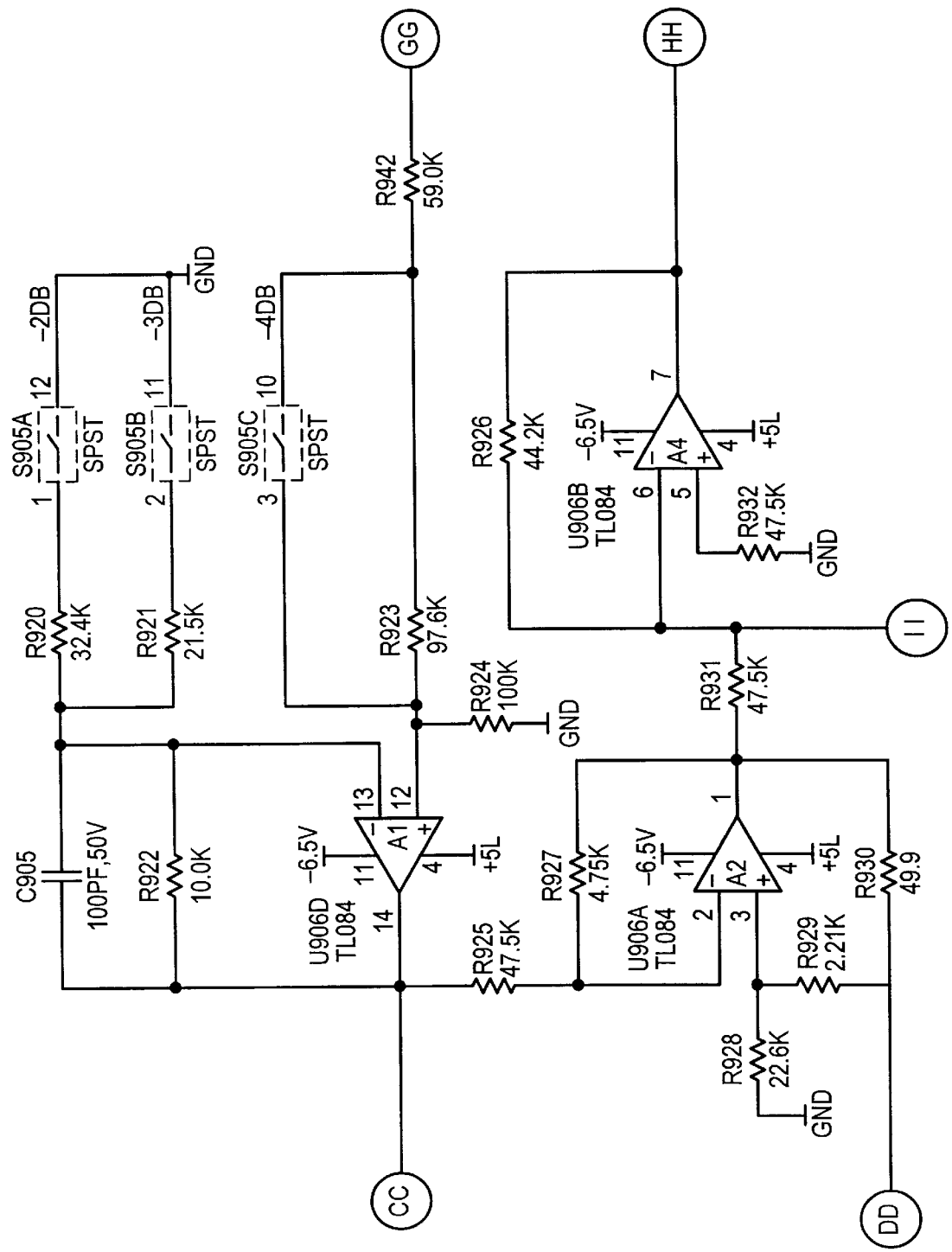
Figure 3D:
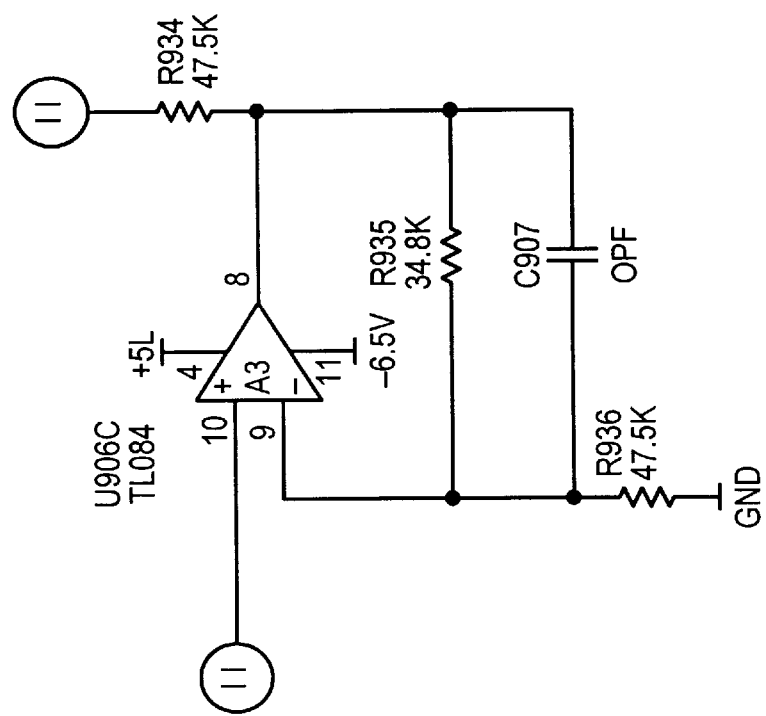
Figure 3E:
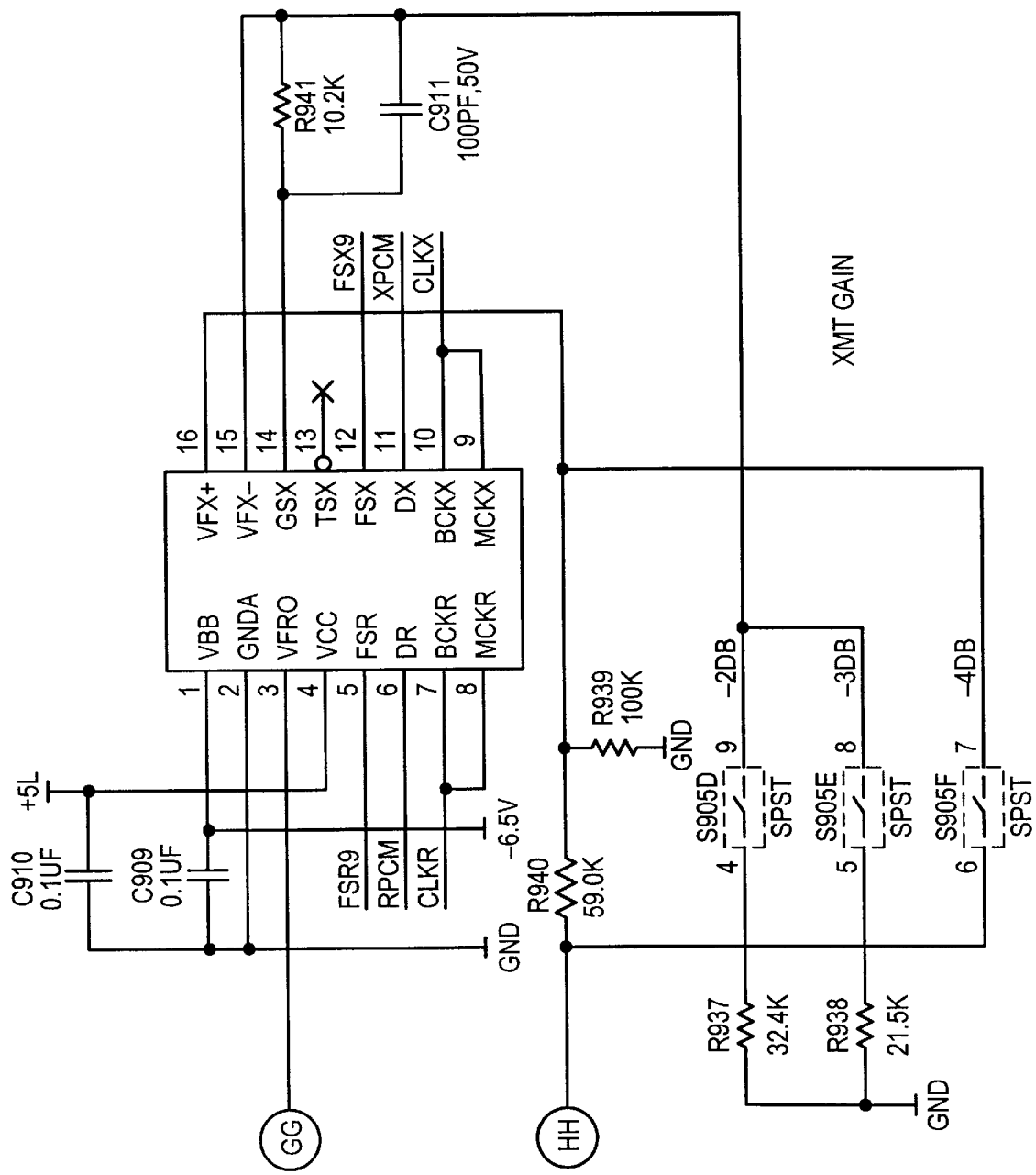
Figure 4A:
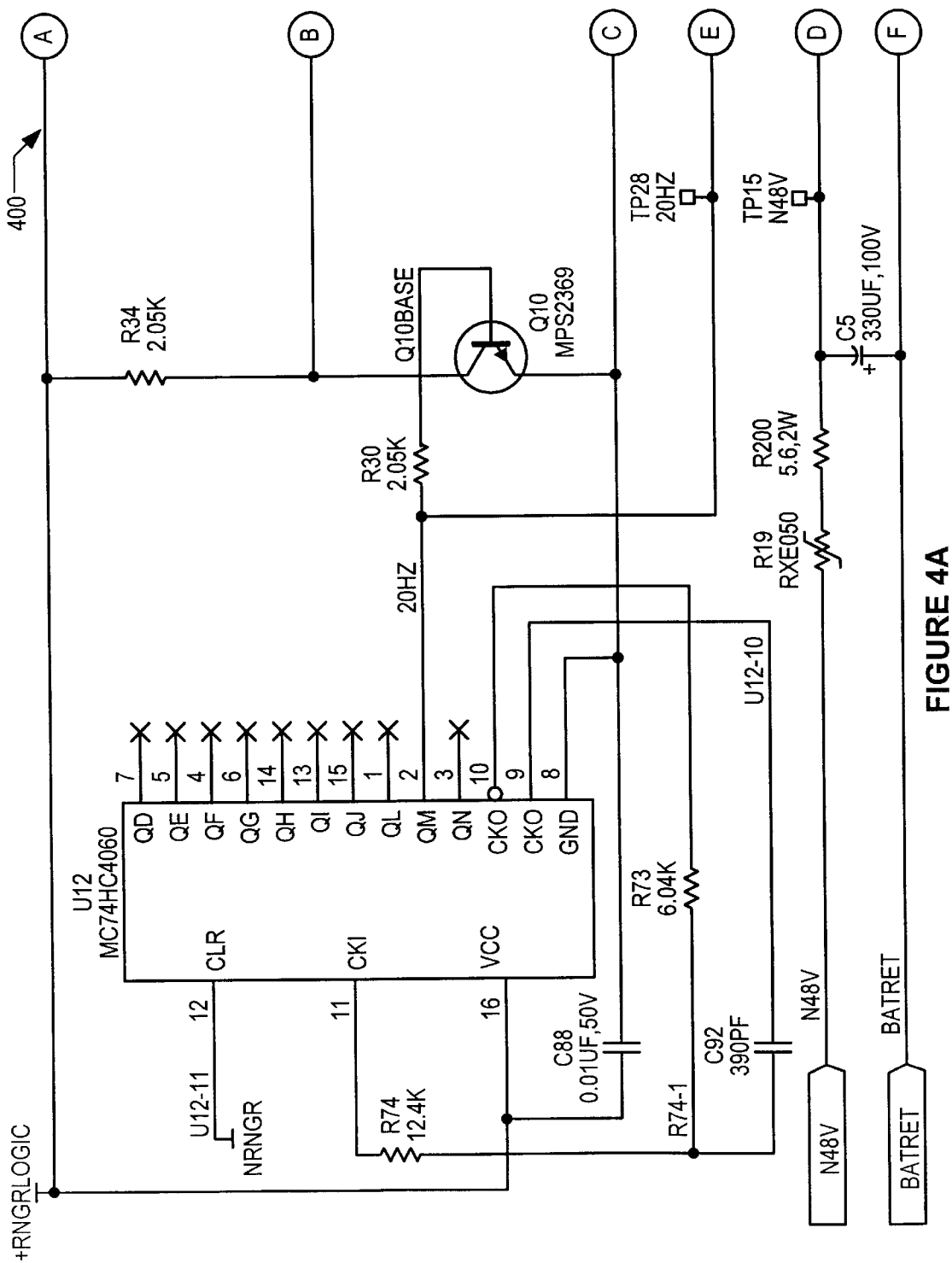
FIGS. 4A,4B,4C,4D illustrate a circuit diagram of a ringing voltage generator having a positive voltage pulse with respect to a negative power supply voltage.
Figure 4B:
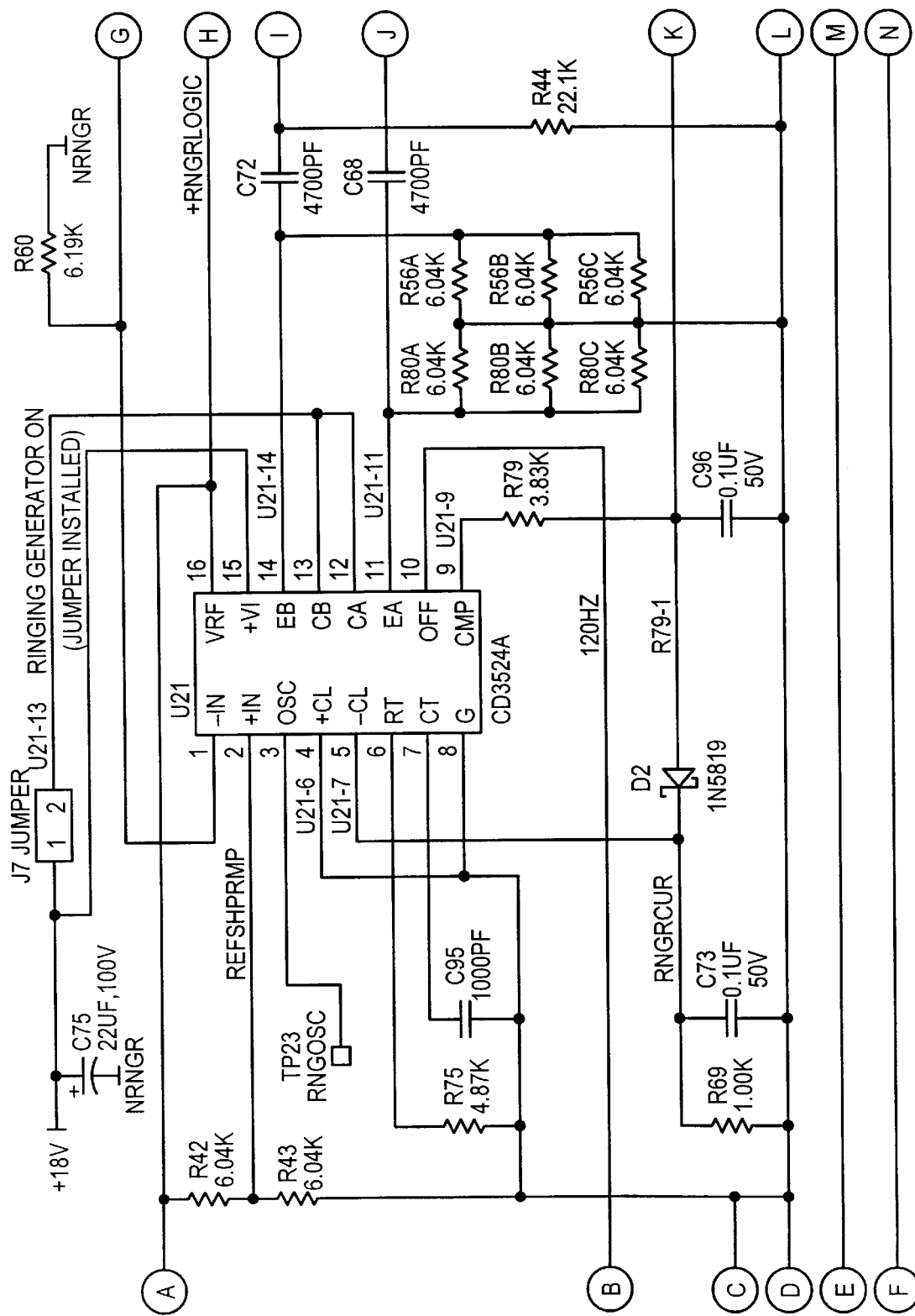
Figure 4C:
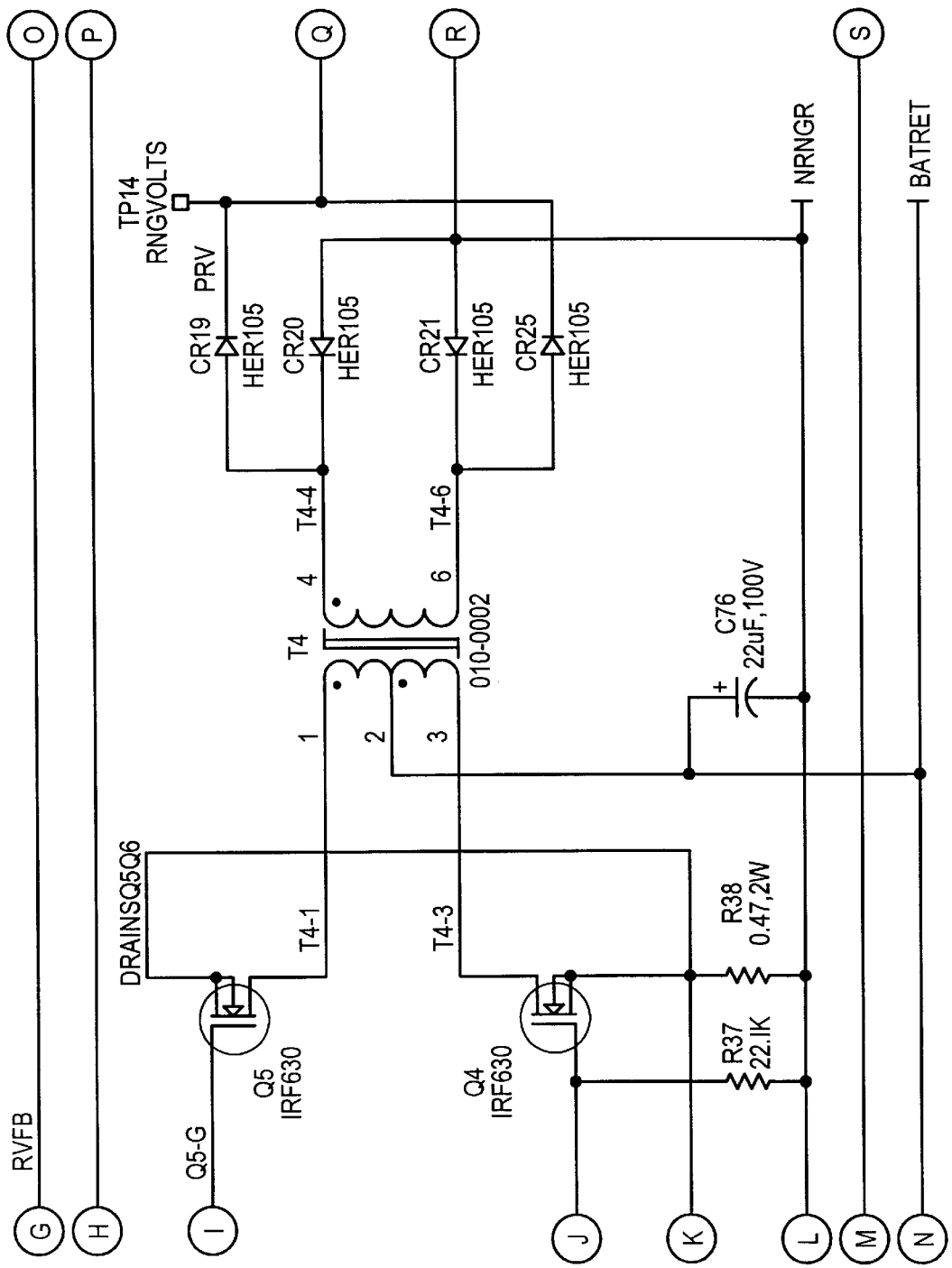
Figure 4D:
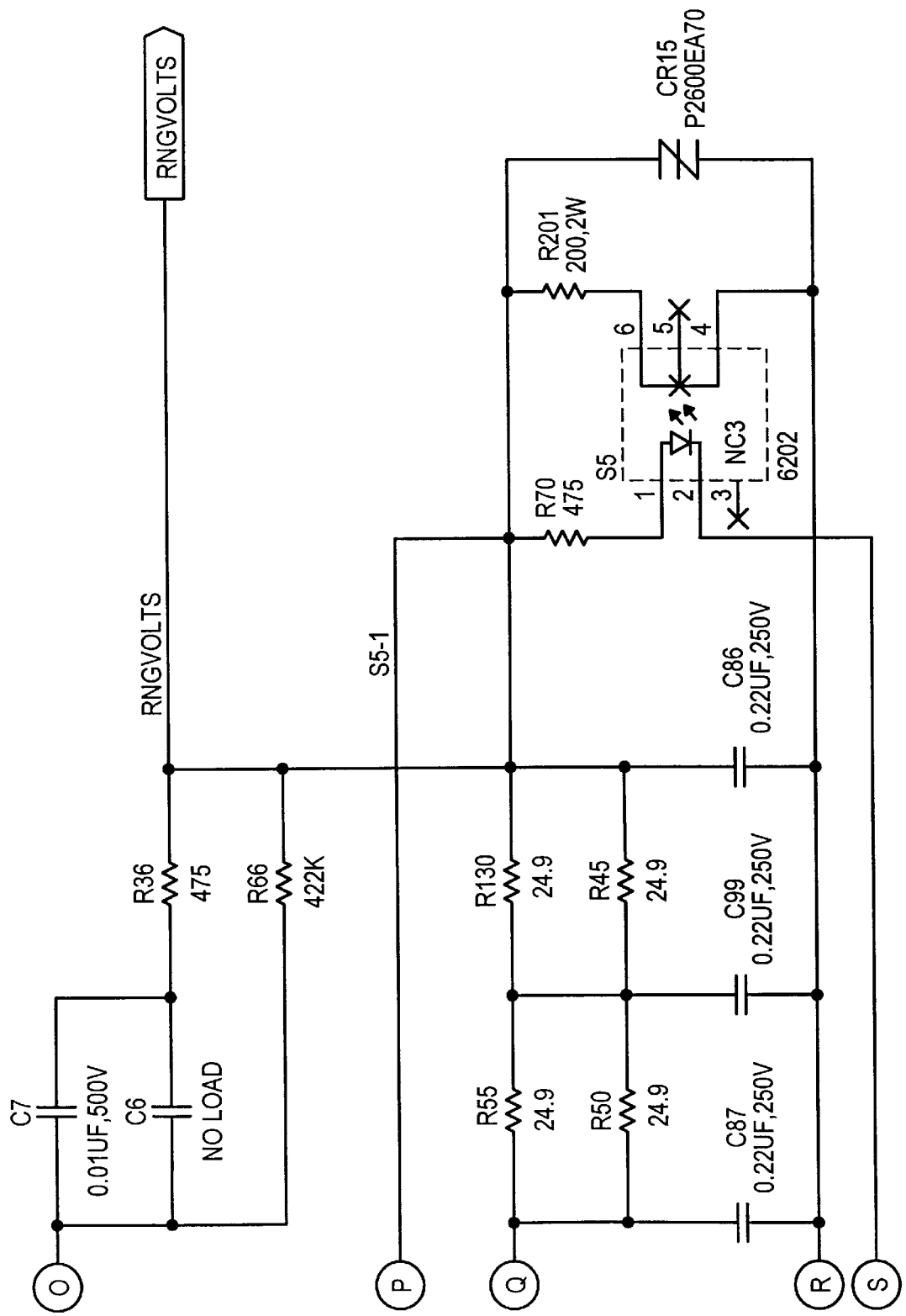

A "battery feed" power source is required, for use by telephone terminating equipment or interfaces at the far end of a wire line. As shown in FIG. 2, the unbalanced current source and current sink 100 provides a regulated current $I_{LOOP}$ to the wire line 101 via the connections to the line 100, TIP and RING.

The AC coupling device 106 interfaces communication signals $S_1$ between the wire line 101 and the electronic communication system 107. The AC coupling device 106 terminates communication signals with $R_{TERM}$ and $C_{TERM}$, typically 900 ohms and 2.16 microfarads to match the impedance of the wire line 101. Capacitor $C_{TERM}$ blocks DC current flow from the unbalanced current source and current sink 100 into the AC coupling device 106. Thus, the size of the AC coupling device 106 is decreased compared to a traditional coupling device that must handle DC currents. Since the AC coupling device 106 provides a matching termination to the wire line, the source impedance of the unbalanced current source and current sink 100 must be much higher than the terminating impedance provided by the AC coupling device 106.

Battery 105 is a low-impedance source for current $I_{LOOP}$ to the wire line 101. The unbalanced current source and current sink 100 must maintain at least a minimum potential of $V_{REG,MIN}$. Maintaining a minimum potential $V_{REG,\ MIN}$ that the required high source impedance is provided by each current regulator, $REG_T$ and $REG_R$. To meet requirements of providing $I_{LOOP}$ over a range of load resistance presented across TIP and RING by the wire line, each current regulator must maintain a maximum potential no greater than $V_{REG,\ MAX}$. Common, inexpensive semiconductor current sources alone are not adequately matched to meet these voltage constraints. Prior implementations to feed $I_{LOOP}$ from a high-impedance current source have used expensive, precisely matched (current mirrored) regulators for $REG_T$ and $REG_R$.

The unbalanced current source and current sink 100 uses resistors $R_T$ and $R_R$ to compensate for variations between regulators $REG_T$ and $REG_R$ (ie. $I_{T,REG}$ does not exactly equal $I_{R,REG}$), so that inexpensive regulators can be used. Specifically, $R_T$ and $R_R$ are chosen to assure that $$I_{LOOP}=I_{T,REG}+I_{T,RES}=I_{R,REG}+I_{R,REG}$$

within the constraints on $V_{REG,MIN}$ and $V_{REG,MAX}$. To accomplish this if $R_T=R_R=R$ and if the maximum difference between $I_{T,REG}$ and $I_{R,REG}$ is $I_{DIFF,MAX}$, then R is chosen to meet $$V_{REG,MIN}/R+I_{REG,MAX}=V_{REG,MAX}/R+I_{REG,MIN},$$

or $$R=(V_{REG,MAX}-V_{REG,MIN})/(I_{REG,MAX}-I_{REG,MIN})$$

For example, the above calculation using typical values for $V_{REG,MAX}$ (6.0 volts), $V_{REG,MIN}$ (3.0 volts), $I_{REG,MAX}$ (28 mA), and $I_{REG,MIN}$ (27 mA) gives 3.0 kohms for R. The value of $R_T$ and $R_R$ can be decreased from this value to account for resistor tolerances.

Together, the unbalanced current source and current sink 100 and the AC coupling device 106 provide excellent longitudinal-to-metallic balance when measured to standards such as FCC Part 68, IEEE Standard 455-1976, and AT&T TR43801. Good longitudinal balance is required to avoid the pick-up of induced noise sources, such as power line "hum," in wire-line communications circuits. The unbalanced current source and current sink 100 provides a very high impedance to both metallic and longitudinal; AC signals. For longitudinal signals from wire line 101, $R_T$ appears in series with TIP, and $R_R$ appears in series with RING. In our example above, with $R_T=R_R=3.0$ kohms, longitudinal balance is 60 dB with a mismatch of 1% between the resistors. This is an improvement of 8 dB compared to the balance obtained with traditional 450 ohm resistors matched to 1%. Since the AC coupling device 106 does not carry any DC, it has no path to circuit ground, and does not contribute any longitudinal-to-metallic signal conversion.

The telephone line interface analog circuitry utilizes an electronic hybrid circuit comprised of $A_1$, $A_2$, $A_3$ and $A_4$ as shown in FIG. 3A–3E illustrate. The received voice band signal received from the carrier system drives the non-inverting input of $A_1$. The gain of $A_1$ is controlled with three SPST switches S905A, S905B and S905C giving a range of control by voltage, dividers R942, R923 and R924 and change of gain by feedback resistors R920 and R921. The output of $A_1$ drives the inverting input of $A_2$ and the non-inverting-input of $A_3$. Amplifier $A_2$ is configured as a Howland Current Pump. The output of the circuit is at the junction of R929 and R930 and connected to the balancing network C904 and R912 across the secondary of T901 in series with C903. The Howland Current Pump delivers a constant current to these components if the value of $R_{930}=(R_{927}/R_{925})\cdot R_{929}-R_{928}$. When this condition is met, the negative resistance offered by $R_{930}$ by the positive feedback of $A_2$ equals the positive resistance of $R_{929}+Rg_{928}$ resulting in an extremely high source impedance to the output current being delivered to the transformer secondary and balance network. The value of the current is determined by the voltage at the output of $A_1$ and a resistive network comprised of $R_{927}$, $R_{925}$ and $R_{930}$ and is: $I_z=-V_{in}\cdot R_{927}/(R_{925}\cdot R_{930})$.

The above constant current Iz divides between T901+ C903 and $R_{912}$ in parallel with C904. The current to the transformer T901 and capacitor C903 being the total current $I_L$ due to the output of $A_1$ and the resistive network multiplied by the impedance of the balance network and divided by the sum of impedance of the balance network and the transformer-capacitor branch.

$$[(V_{in}\times R_{927})/(R_{925}\times R_{930})]\times[Z_{Bal}/(Z_B^{al}Z_{Trans})]$$

At the low end of the voiceband around 500 to 1000 Hz the impedance of the transformer recedes because of the relatively small inductance of the miniature transformer. Typical values of inductance for these small devices is 0.5 Henry. By placing $C_{903}$ in series with this transformer inductance, a resonant frequency of about 300 Hz may be achieved. At this frequency the impedance of the branch is minimum and in accordance with the above formula the maximum current flows through $T_{901}$ improving its response at the low end of the band.

The electronic hybrid circuit consists of $A_2$ and $A_3$. The voltage created by the constant current output of $A_2$ and its resistor networks produced by the parallel combination of balance network and the transformer branch appears at the output terminal 1 of $A_2$. This voltage is inverted from the output of A1 by the current pump $A_2$. The output of $A_1$ is also connected to the non-inverting input of $A_3$ whose gain and phase are controlled by the feedback network on the inverting input. The purpose of $R_{935}$, $R_{936}$, and $C_{907}$ are to adjust the gain and phase of the output of $A_1$ to cancel its inverted image at the output of $A_2$ in the summing resistors $R_{931}$ and $R_{934}$ at the input of $A_4$.

Also present in the output of $A_2$ is the non-inverted image of the received signal from the transmission line. $A_4$ passes this received signal, inverted and slightly diminished to a voltage divider network adjusted by switch S905F. Additional attenuation is provided by S905D and S905E and the action of TP3054N.

A ringing generator function is accomplished by creating positive voltage pulses with respect to a negative power supply voltage.

Description

The following description includes references () to the above design factors. The design meets the design factors referenced.

Figure 5:
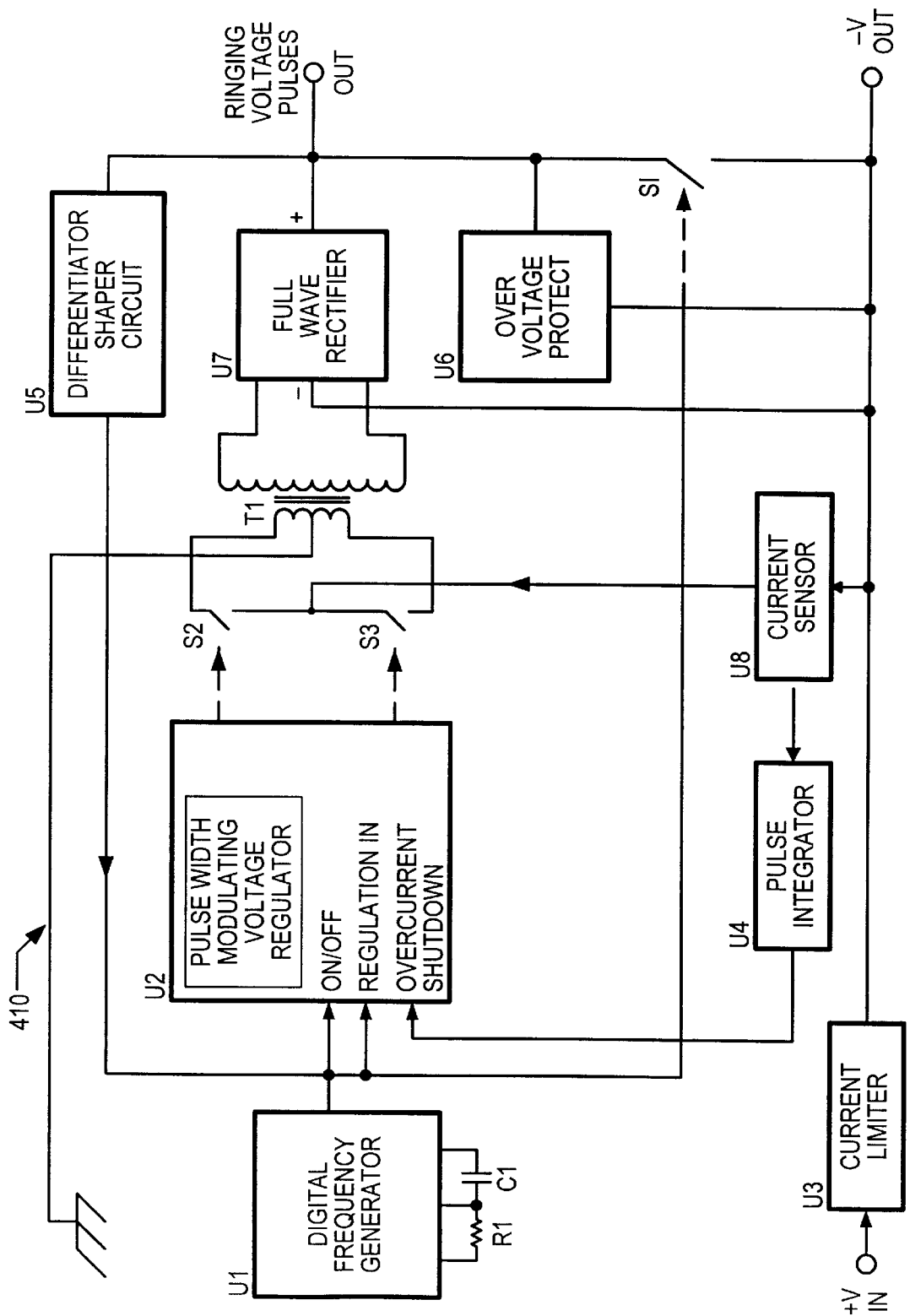
FIG. 5 is a block diagram of the ringing voltage generator of FIG. 4.

The circuit (410) shown in FIG. 5 meets these somewhat conflicting criteria:

A push-pull switching voltage regulator circuit (U2) is switched on and off at the desired ringing voltage pulse ate (Factor C). The ringing voltage pulse rate is governed solely by U1, the digital frequency generator. The voltage regulator is turned on and off by U1's output. This frequency may be varied over the needed range by the high frequency control element, which could be a resistor/capacitor, ceramic resonator, or crystal. The output of the U1 is also fed to a switch (S1) on the output of the regulator. The operation of this switch is such that when the voltage regulator is on, the switch is open. When the regulator is not generating voltage, the S1 is closed, discharging any capacitance across the output terminals. (Factor D)

The push-pull switching voltage regulator operates at a frequency thousands of times that of the ringing voltage pulse rate, allowing energy control with smaller circuit elements. Output switches S2 and S3 are alternately operated Open and Closed to apply an alternating high frequency current through the transformer T1. The voltage applied across T1's primary winding is multiplied by the turns ratio of the Transformer which boosts the circuit's supply voltage by many times. (Factor J) The Transformer is would to provide the proper output impedance for the circuit, under maximum load conditions. (Factor B). The transformer T1 multiplies the supply voltage about 8 times. This high frequency AC energy is delivered to the full wave bridge (U7) to produce ringing pulses of a singular positive polarity of approximately 180 volts peak.

The pulse peak output of U7 is summed on top of the Vin voltage node. This −Vin voltage source is current limited by U3, U3 contains circuitry to limit noise spike current and large heating current due to normally catastrophic events such as high voltage power cross.

A voltage divider feed back circuit incorporated into U5 causes the voltage to be limited to approximately 190 volts peak, (or approximately 86 volts rms., the waveform being a shaped rectangular wave at the desired ringing pulse frequency). (Factor E) The speed of the turn on of the voltage generator (U2) is governed by the differentiator circuit of U5. Thus the crest factor required by some specifications may be set by U5 (Factor A).

The push pull circuit of S1/S3 is used to tend to minimize the RF radiation from the high frequency switching circuit. The voltage doubler action of the push-pull circuit also tends to minimize transformer ratios, improving the efficiency of the circuit. The symmetrical nature of the switching of the push-pull circuit tends to minimized RF radiation from the circuit. (Factor H). The construction of the transformer using pot cores with a plastic bobbin insert reduces RF radiation. The circuit may also be constructed of a Toroidal Core transformer, minimizing electrmagnetic radiation.

Circuit overload protection is provided by a current sensor, U8 operating in concert with U4, the Pulse Integrator circuit. Each output pulse is approximately the same peak current level, and the current sensor applies a voltage proportional to the width and amplitude of the peak current to the pulse integrator U4. If sufficient quantity of pulses are applied to the integrator in a time period, the Over current shutdown pin of U2 circuit will limit the width and quantity of pulses controlling S2 and S3. When the over load condition is removed, the circuit operation will return to normal, and the DC output of the Pulse Integrator circuit of U4 will return to a non-current limiting (lower) voltage level. (Factor F).

If the differentiator Shaper circuit U5 were to open, excessive voltage would appear at the generator's output terminals. Overvoltage Protector U6 will short to a very low impedance within a few microseconds of detection of the voltage being over 240 volts, approximately. This will lower the output voltage to only a few volts over the negative voltage supply to the circuit. (Factor E and Factor I)

FIGS. 4A–4D illustrate the ringing generator circuit (400). Power to the ringing generator circuit (400) is isolated, at least from short conditions, by PolySwitch® R19, a Raychem RXE050. The device referred to as a PolySwitch® is a positive temperature coefficient resistor. When the current rises above a predetermined level the PolySwitch® will increase its resistance by several orders of magnitude. Incorporated herein by reference are the following U.S. Pat. Nos. 4,237,411; 4,238,812; 4,413,301; 4,475,138. This device has a trip current of 1 amp and a holding current of ½ amp. Resistor R200 is a 5.6 ohm 2 watt resistor in series with the Negative 48 volt (N48V) current supply path. Capacitor C5 supplies peak current to the ringing generator circuit (400) during periods of hook switch detection. This occurs when the ringing generator relay (not shown) on the FXS card (not shown) is operated and is connecting the RNGVOLTS signal to a particular FXS circuit on that card. When someone picks up a telephone on a ringing tip/ring pair, the telephone's hook switch closes, and momentarily a large current flows in the tip/ring circuit. This peak current could cause noise in the adjacent channels. Resistor/capacitor combination R200/C5 serve to isolate channel served by the same power supply from the noise present on the RNGVOLTS node when a ringing telephone goes off hook.

Figure 6:
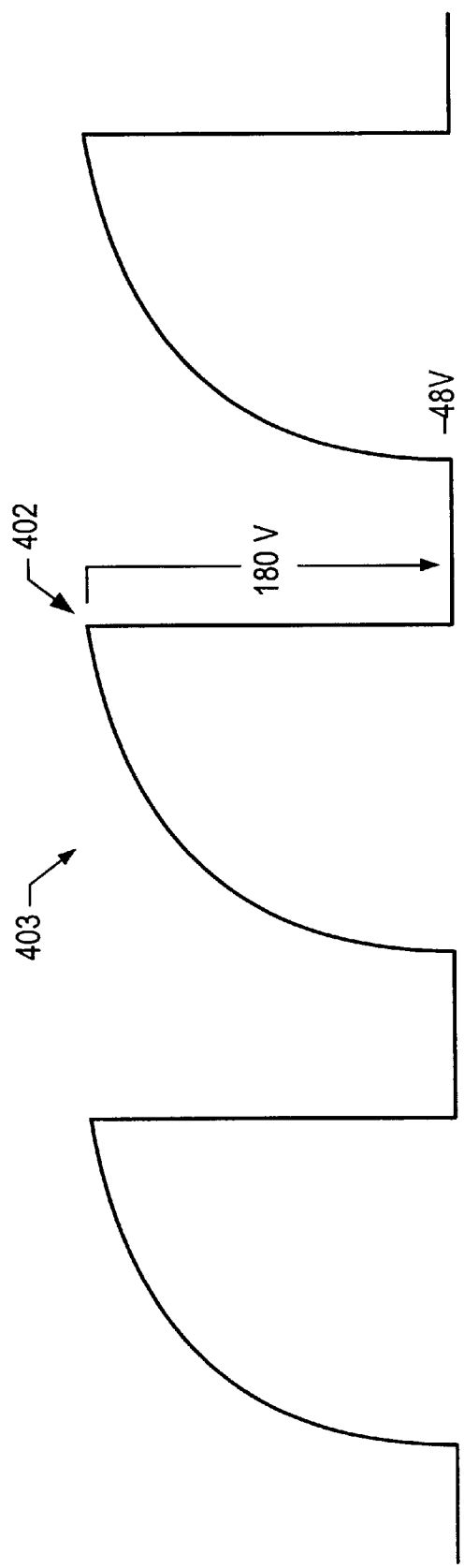
FIG. 6 is a graph of the ringing voltage output of the generator shown in FIGS. 4, 5.

The general purpose of the ringing generator is to produce a rounded waveform shape (FIG. 6, 403) to about 180 V peak (402), riding on top of the negative supply voltage (401). This is accomplished by turning on and off a DC/DC step-up converter at an on/off rate of 20 Hz. The waveform produced with each turn-on begins with a gradual ramp-up at a rate governed by an R-C time constant (403). At the end of each pulse of the waveform (403), a switch (S5) closes across the generator's output to discharge any residual charge remaining on the output. The load (not shown) presented to the ringing generator is often mainly capacitive, and S5 returns any residual charge, after the end of a ringing pulse, to zero. Resistor R70 limits the peak current through S5, keeping noise inducing current a minimum.

Within the ringing generator circuit (400) two internal voltages are used (generated with FIG. X): A switched 18 volt level (+18V) for operating the pulse driving circuitry and a +5 Volt level (+RNGRLOGIC) for operating the digital counter circuit (U12). Both this +5v level and the +18v level are relative to the N48V node. The +18v level is obtained from a zener diode regulator circuit, CR5 (not shown), which is then routed through the series solid state switch contacts of U7 (not shown). Switch U7 (not shown) is operated by the comparator U10 (not shown). Comparator U10 (not shown) is part of a circuit that senses the input power supply voltage (N48V) node and temperature. If the input DC voltage level (N48V) is −42 volts are greater, and if the temperature is less than 40 deg.C. then U7 (not shown) is closed, which then applies +18V to the ringing generator circuit (400). The 15 volt level is obtained from a voltage reference regulator which is located inside the switching regulator integrated circuit, U21.

When voltage is applied to the circuit (400), an internal oscillator inside of U12 begins operation. U12 is combination oscillator and 14 stage ripple counter. The oscillator operates at about 81 kHz (for a 20 Hz pulse output frequency). This 81 kHz frequency is set by R74, R73, and C92 and is applied to the input of the ripple counter, located inside U12. Component C92, R73, and R74 form frequency control elements which may easily be changed, which also might consist of a crystal, ceramic resonator, or similar frequency source. A 20 Hz squarewave is obtained by the down counter at U12 Output QM. This is applied to the base of Q10, through R30. Resistor R30 limits the amount of base current through Q10, and presents a high impedance to the output of the 20 Hz source, U12 output QM. The common emitter circuit of Q10 inverts that phase by pulling down the voltage across R34. This action of Q10 provides two logic level signals such that when the regulator chip U21 is in the cutoff (non-pulse producing) state, then S5 is closed. As mentioned earlier, S5 then removes any residual charge from the output. When the 20 Hz signal goes high out of U12 output QM, then S5 opens, allowing the RNGVOLTS node to go to its high voltage level, driven by the pulses from Transformer T4, across the high frequency diode bridge formed by CR19, CR20, CR21, and CR25. Capacitor C76 provides a low impedance path for the high frequency currents produced by the alternate switching action of Q4/Q5.

Integrated Circuit U21 is a pulse width modulator circuit. It produces pulses to alternately turn-on a pair of transistors whose collector/emitter pairs are connected to pine 14/13/ and 12/11. Voltage to operate these output pairs comes from jumper J7. J7 is installed as part of the manufacturing process, to allow manufacturing personnel the option of turning off the high voltage generator, when not needed. Capacitor C75 provides local filtering of the +18 volts. Positive 5 volts to operate the voltage divider string R42/R43 comes from U21 pin16. The divider string mentioned provides 2.5 volts to U21 pin 2, as a reference for operation of the voltage regulator. Test pin 23(RNGOSC) allows factory personnel easily check the frequency of the U21's internal oscillator. Pulses of 3–5 volts amplitude are output at this test point. Resistor/capacitor pair R75/C95 are selected to provide a switcher frequency in the range of 120 to 200 kHz. Resistor/capacitor pair R79/C96 are installed at U21 pin 9 in order to stabilize the operation of the voltage feedback loop.

Output pulses are formed across the parallel combinations of R80A/B/C and R65A/B/C to provide pulse width which is proportional to output voltage. These pulses are fed to the gates of the MOS transistors Q4/Q5 through coupling capacitors C68/C72. Resistors R44/R37 limit the amount of charge across the gate input capacitance of the transistors Q4/Q5.

Integrated circuit U21's internal oscillator operates at about 120–200 Khz, producing a push-pull drive to power, MOS FET transistors Q4 and Q5. Each MOS FET alternately turns on, providing a peak current of 1 to 2 amps of across the through the primary of T3. The source connections of Q4 and Q5 are tied together and connected to the negative 48 volt rail through R38. The pulses appearing across R38 are integrated by D2, C73, R69. The time constant of R69/C73 determines the over current sense level that will shut down the output of the ringing generator.

The voltage appearing across the center-tapped primary of T4 is stepped up 8 times to provide 400–500 volts peak open-circuit voltage into capacitor C87. This amount of voltage can never appear across the output, because of the high voltage/high frequency pulses are integrated across the C87. The pulse density is controlled by U21 to regulate the output voltage when the circuit is in operation. The output voltage is fed back to the switcher by resistive divider network R66/R60. Capacitors C7 and C8 together with resistor R36 form a differentiator circuit across R66 to limit the initial turn-on risetime of the output of the ringing generator circuit. This action is approximated by the formula $$Vout = Vmax(1 - e^{\wedge}t(R36) \times (C7 + C6))$$

Ringing output overvoltage is protected by SIDACtor® CR15. This device has a 240 volt breakover point. Should a lightning strike, high voltage power cross, or other similar event occur, the circuitry of the ringing generator would be protected by CR 15 triggering to a low resistance. The resistance to the SIDACtor® will stay low until the current drops below the minimum holding current of the device (ie. it acts as an automatically resetable crow bar). If the voltage feedback path to pin 1 of U 21 should fail open, a large DC voltage could be placed on the RNGVOLTS node. All of the circuitry connected to the RNGVOLTS node have breakdown voltage of at least 350 volts. Therefore, the possibility of damage by ringing generator circuit (400) itself is protected by SIDACtor® CR15.

Figure 7A:
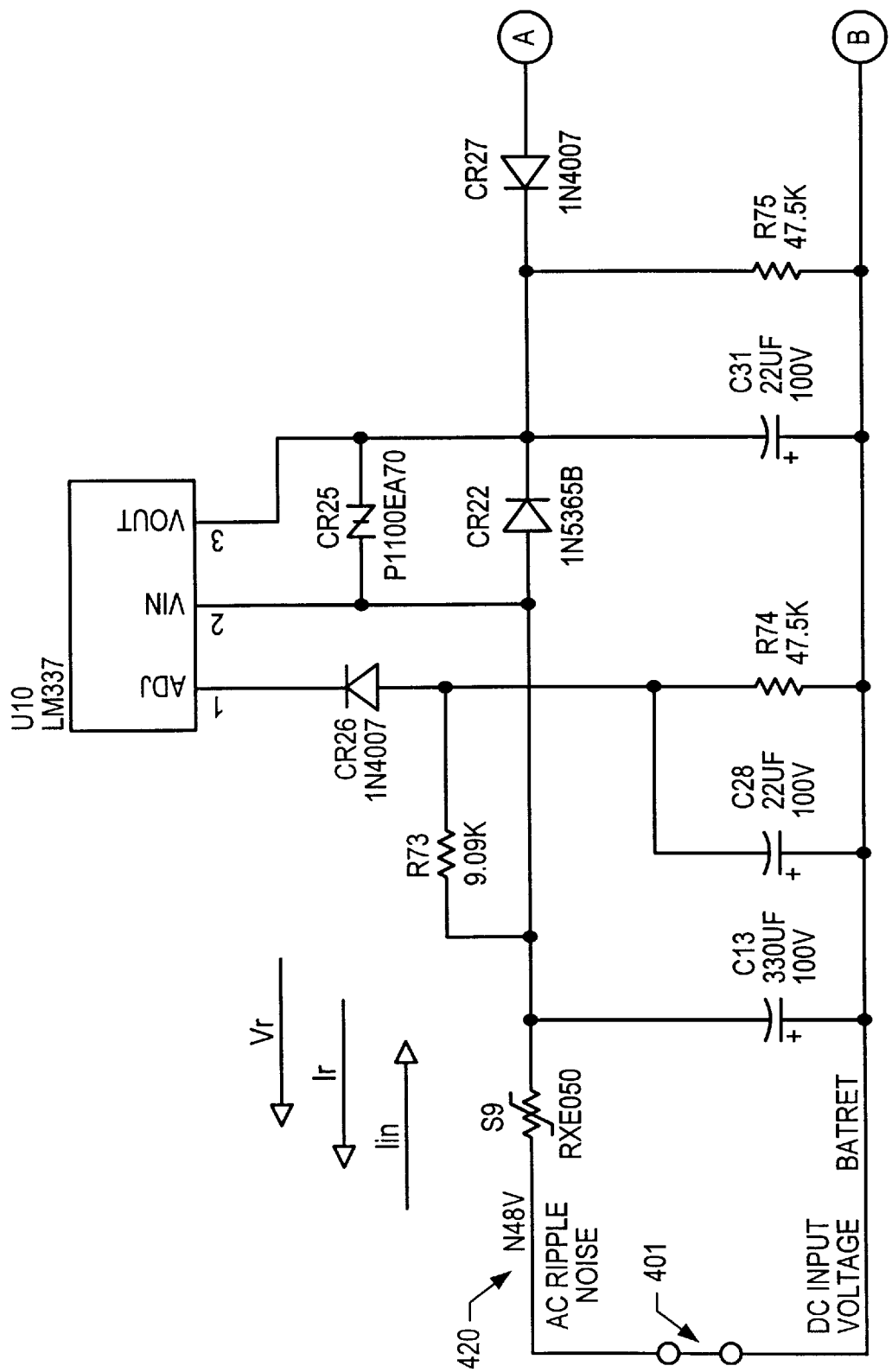
FIGS. 7A and 7B are a circuit diagram of a telephone filter line having an active linear floating filter.
Figure 7B:
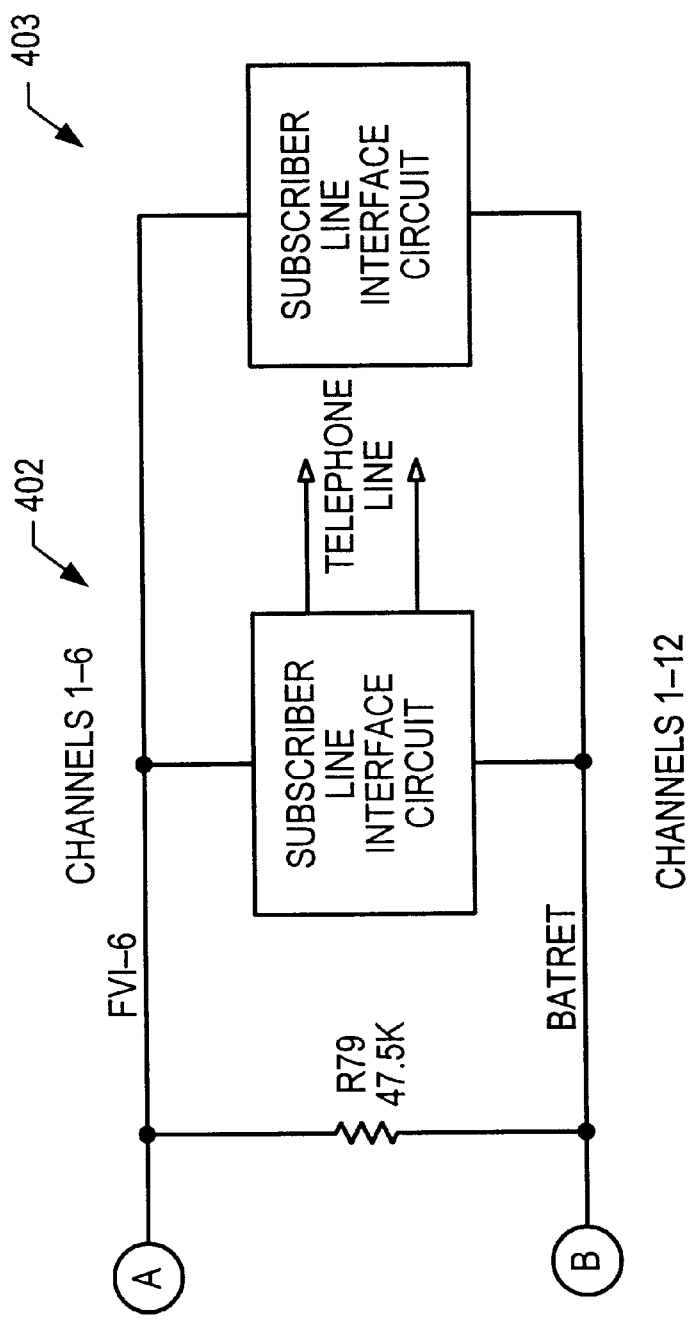

Removal is shown of AC power ripple by using an active linear floating filter for the purpose of powering telephone circuits. FIGS. 7A–7B are schematics of the circuit to remove AC power ripple using an active linear floating filter.

This electronic technique attenuates AC ripple noise (420) from rectified transformer power supplies by factors up to 100, without the use of large capacitances. Unlike conventional fixed voltage linear regulators, the output voltage of the circuit floats with respect to the absolute value of the rectified AC input source (Vs). That is, a 10% increase in the DC input voltage (401) will produce approximately a 10% increase in the output voltage (Vo). Conventional fixed voltage linear regulator power supplies produce an output voltage that remains the same, regardless of input source changes.

The purpose of this new circuit is to provide a filtered DC voltage for powering telephone Subscriber Line Interface Circuits (SLICs) (402). One function of SLICs (402) is to provide a DC line current to terminating equipment at the other end of the line, for example telephone sets (not shown). The DC line current must be substantially free from AC noise sources, such as 50 or 60 Hz ripple, that would be heard by telephone users. By selecting a SLIC circuit (402) with a reasonably wide input voltage range, this new technique provides noise-free current to the telephone line without large component size, cost, and power dissipation inherent in using a fixed voltage-regulated power source.

Conventional fixed voltage-regulated linear SLIC power sources dissipate a significant amount of power and heat. This is necessary to accommodate the typical range of plus or minus 20% input voltage fluctuations from commercial power mains and step-down transformers. The new power filter circuit described here maintains a somewhat constant DC voltage drop (Vr) rather than a constant DC voltage output (Vo).

FIGS. 7A–7B shows the new technique to power telephone SLICs whereby an adjustable linear regulator semiconductor circuit (U10) has its adjust terminal connected to a fixed voltage divider ratio (R74/(R73+R74)) of the input voltage source (Vs). The linear regulator semiconductor circuit (U10) has a reference voltage (Vr is typically 1.25 Vdc), and amplifiers (not shown), which act to maintain Vr between the In and Adjust terminals. Current Ir=Vr/R73 flows almost entirely through the voltage divider (R73 and R74), as very little error current flows into the high-impedance Adjust terminal. Voltage Vo at the Out terminal of the linear regulator semiconductor circuit (U10) is related to the current Ir as, Vo=(Ir)(R74)+Vr.

DC current changes in Ir due to variations in the input source voltage Vs cause Vo to change in a linear manner. AC current changes in Ir from 50–60 Hz ripple (or higher frequency noise sources) cause very little change in Vo since the AC current component of Ir is passed to the return node by capacitor C28, and is not allowed to change the voltage at the Adjust terminal (Va). This effectively attenuates the AC component of Vs, as measured at Vo, by a factor as high as 100. AC ripple noise is thus effectively removed for the purpose of powering telephone Subscriber Line Interface Circuits (SLICs).

Resistor R75 is to provide an output return to ground (BATRET) if there are no off-hook SLICs (402) drawing current from the circuit.

Capacitators C13 and C31 serve to filter the voltages at the Vin and Vo terminals of the linear regulator semiconductor circuit U10. Diode CR26 protects the Adjust terminal of the linear regulator semiconductor circuit V10 from a condition where voltage Va is more negative than the Vin terminal. This condition could occur when the source voltage (Vo) is shorted or removed.

If a fault occurs that causes a current greater than ½ amp, Polyswitch® S9 will become a high impedance to limit the input current (Iin) until the fault is cleared. Diode CR27 protects the floating filter from voltages more negative than Vo, which may originate from the telephone or SLICs (402). The linear regulator semiconductor circuit (U10) is further protected from either AC or DC over voltage at the input or output by a 36 volt zener diode CR22 and 110 volt peak SIDACtor® CR25.

Figure 8:
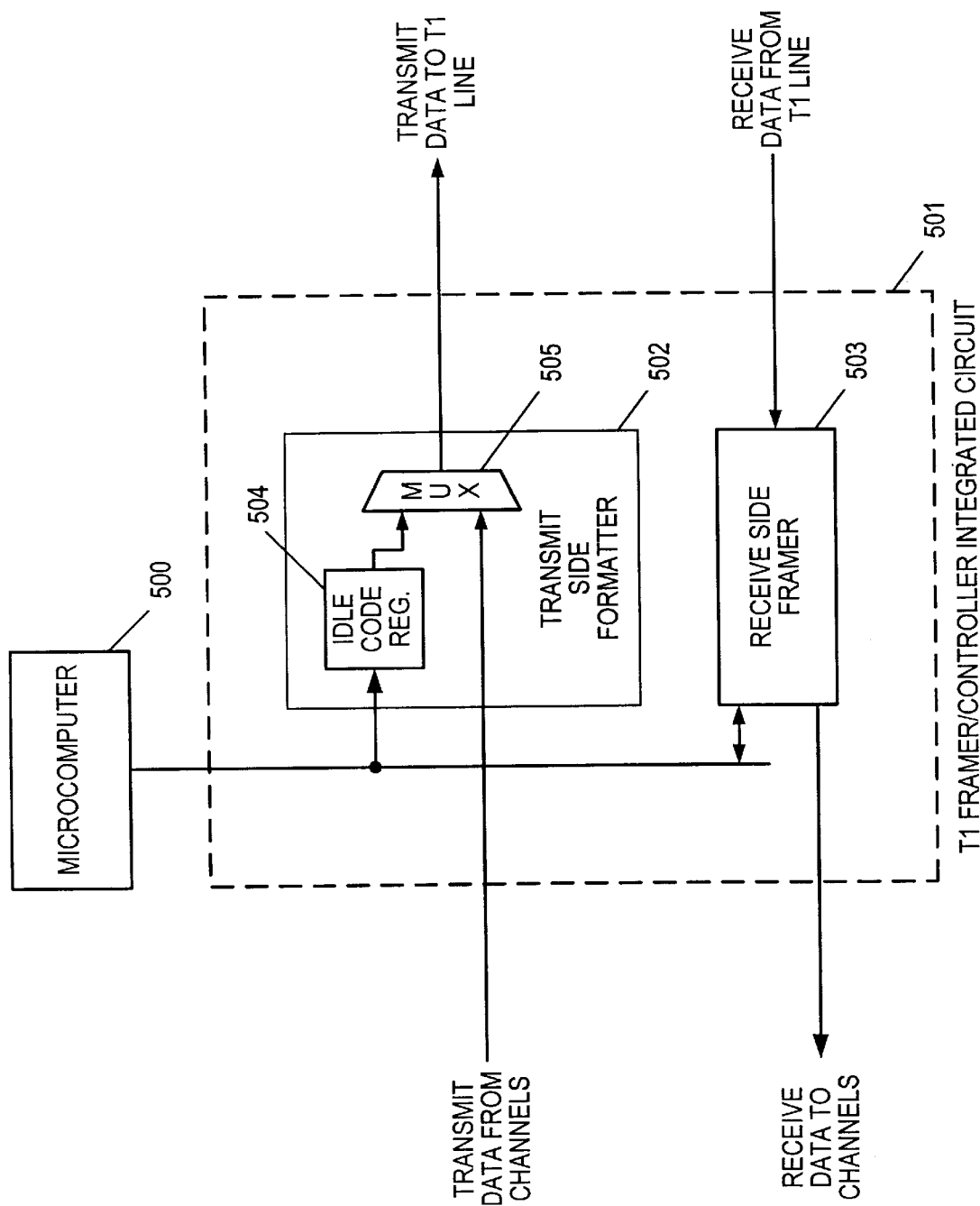
FIG. 8 is a schematic of a real time tone sample injector.

Modern systems for T1 digital time division multiplex (TDM) transmission commonly incorporate integrated circuits that perform many of the digital functions required by the T1 specifications. FIG. 8 shows the use of such a T1 framer/controller integrated circuit 501 in a T1 system. Data encoded from the analog voice channels is processed by the transmit side formatter 502 of the T1 framer/controller integrated circuit 501 for transmission over the T1 line. Functions of the transmit side formatter 502 include framing bit insertion, signaling insertion, and alarm generation. Similarly, the receive side framer 503 processes the receive data stream from the T1 line before decoding into analog voice channel signals. The receive side framer 503 synchronizes the incoming data stream, extracts signaling, and monitors received data for transmission errors.

A T1 framer/controller integrated circuit 501 may be chosen that interfaces directly with a microcomputer 500. In this configuration, the microcomputer 500 controls operation of the T1 framer/controller integrated circuit 501 as well as operation of the communication system of which it is a component. For example, upon reception of an appropriate signaling state from the T1 line, the microcomputer 500 would initiate ringing of the wire line associated with particular channel. Then, the microcomputer 500 would cause the T1 framer/controller integrated circuit to transmit an off-hook signaling state for that channel to the T1 line when the microcomputer detects that the equipment connected to the wire line has gone off hook.

One function of the T1 framer/controller integrated circuit 501 is insertion of an idle code into the transmit data to the T1 line. This allows the microcomputer 500 to replace meaningless data from analog channels that are not in use with a constant value, so that noise is not presented to the equipment at the far end of the T1 line. To accomplish this, the T1 framer/controller integrated circuit 501 incorporates an idle code register 504 that may be programmed by the microcomputer 500. Microcomputer 500 can specify what data to apply as the idle code, and to what channel or channels the idle code should be applied. Then, the transmit side formatter 502 can insert the idle code into the transmit data to the T1 line at the appropriate times, using multiplexer (mux) 505.

In a channel bank application, it can become necessary to insert tones into the data stream transmitted to the T1 line. The tone insertion scheme accomplishes this using only the microcomputer 500 and the T1 framer/controller integrated circuit 501. Since no parts are added to the system for this function, system size and cost are minimized. Unlike a constant idle code that is transmitted identically every 125-microsecond frame, tone generation requires a new sample to be transmitted every frame. Unlike older microcomputers that could only process a few dozen instructions during 125 microseconds, microcomputer 500 can be chosen to process hundreds of instructions during a frame. At the start of each frame, T1 framer/controller integrated circuit 501 alerts microcomputer 500. Then, microcomputer 500 updates idle code register 504 with a value for use during the upcoming frame. Software timing causes these updates to occur at the frame boundary, so that idle code register 504 is not in use during the update.

During the remainder of each frame, microcomputer 500 is available to perform its channel bank control functions. Prior to the start of the next frame, the next value to be inserted into the idle code register must be known. Choices for accomplishing this include calculations and/or look-up tables. To minimize processor loading and memory requirements within microcomputer 500, the tone insertion scheme uses a combination of a look-up table and calculation. Because the frequency spectrum of the implemented tone is sufficiently below the 8 kHz. sampling rate of the data bank that aliasing is not a concern, a look-up table with values for every second frame rather than every frame is used. For the long pattern length of the multitude combination implemented, this saves a considerable amount of memory. To save processor loading, each sample in the look-up table is used twice in successive frames. If improved noise performance of the tone had been required, interpolation between look-up table entries could have been used.

Figure 9A:
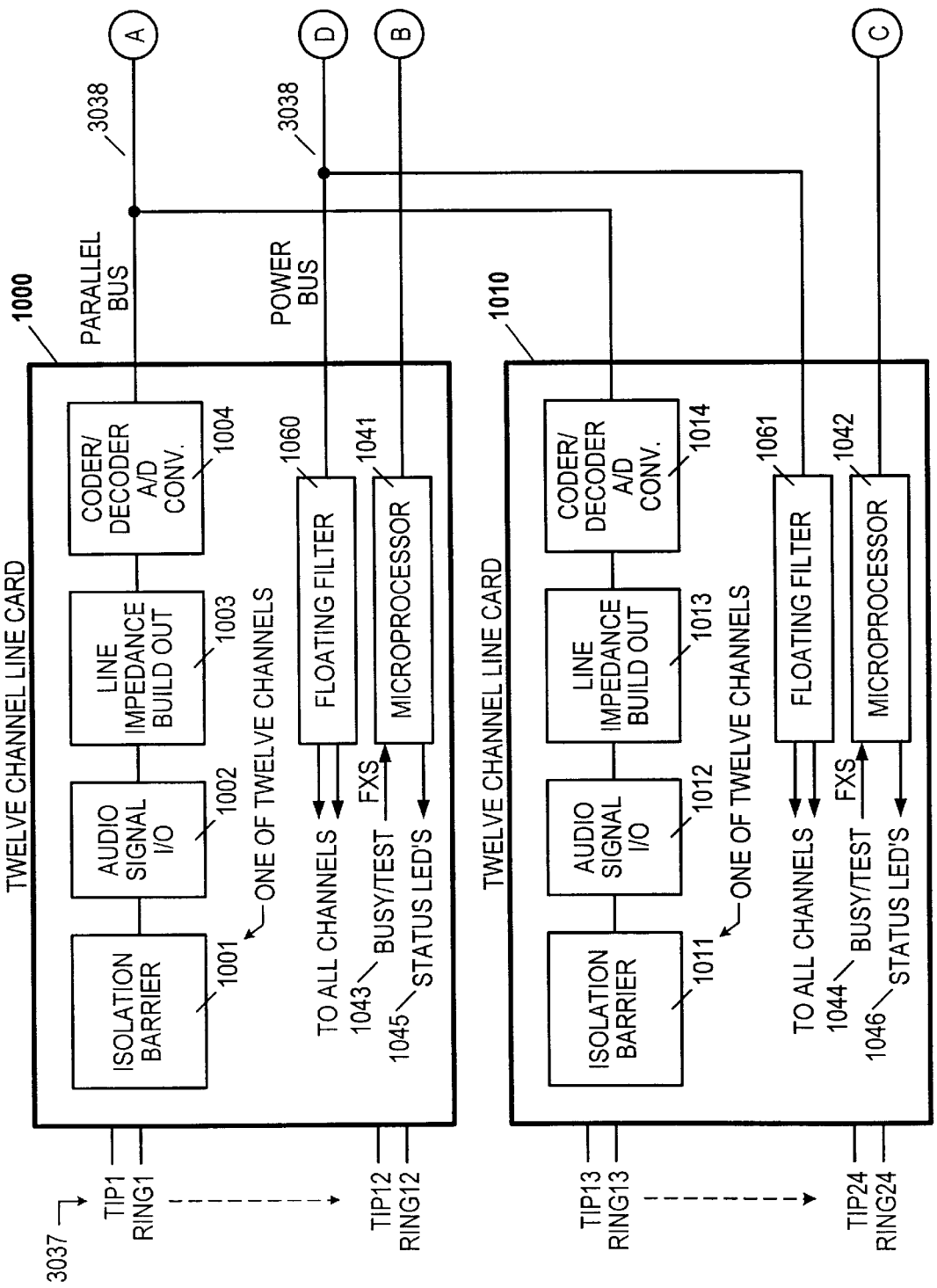
FIGS. 9A,9B illustrate 5 a schematic of the Line Interface Unit (LIU) and Twelve Channel Line Card.
Figure 9B:
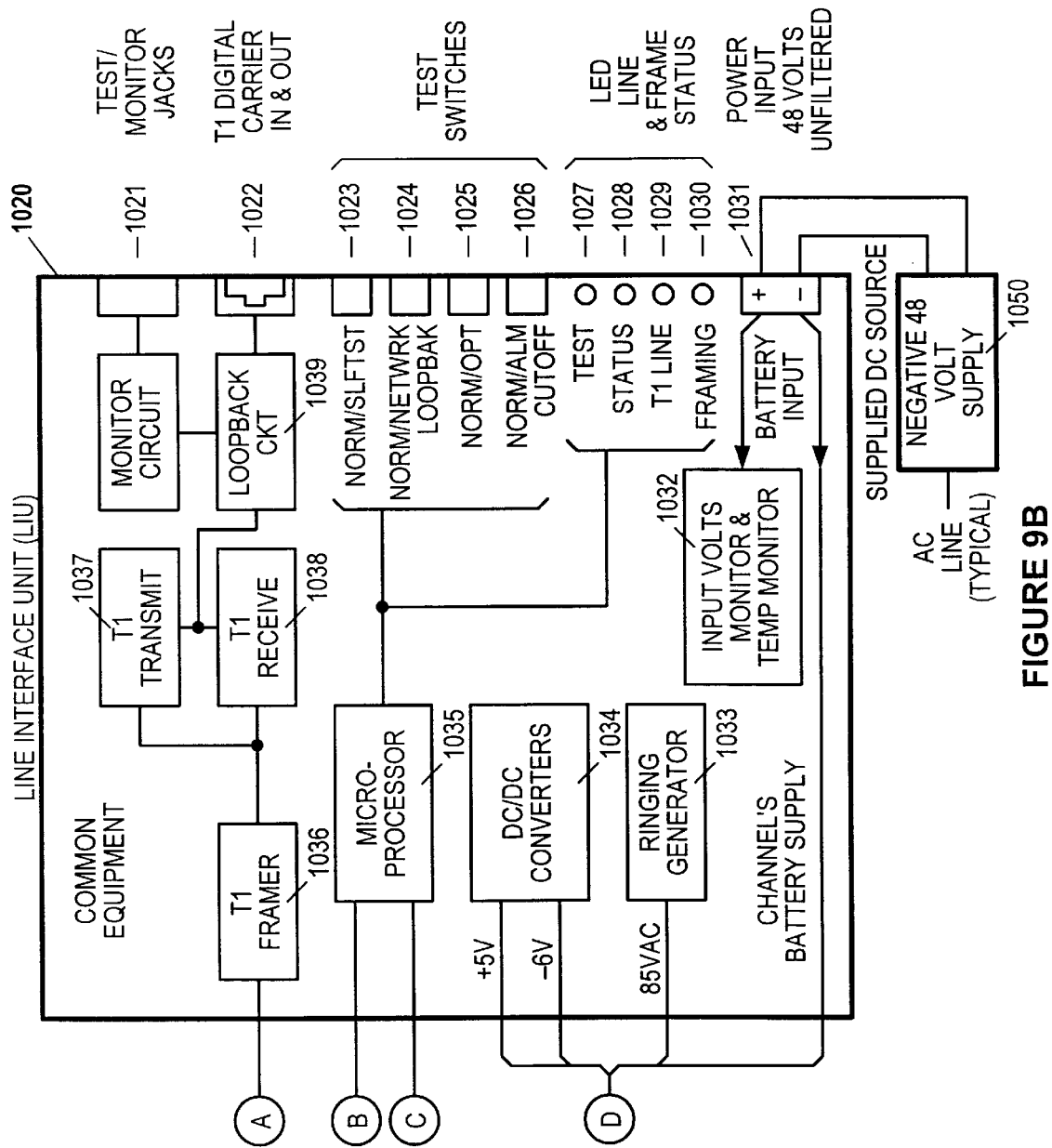
Figure 10:
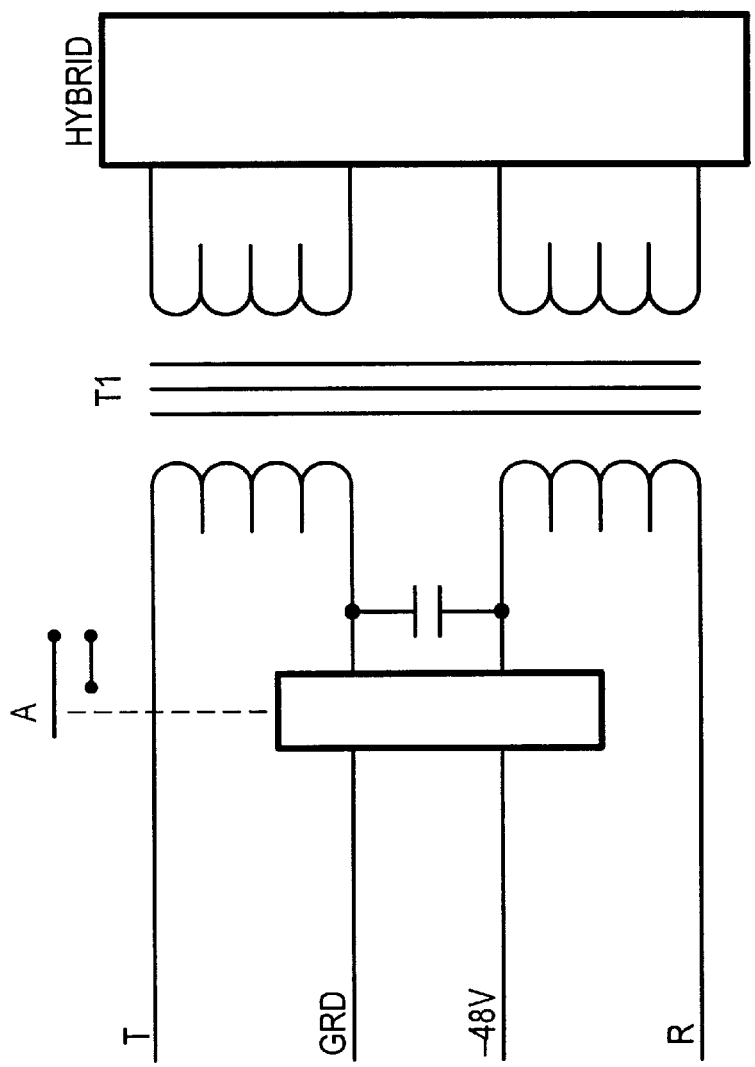
FIG. 10 (prior art) is a circuit diagram of a traditional battery feed technique.
Figure 11:
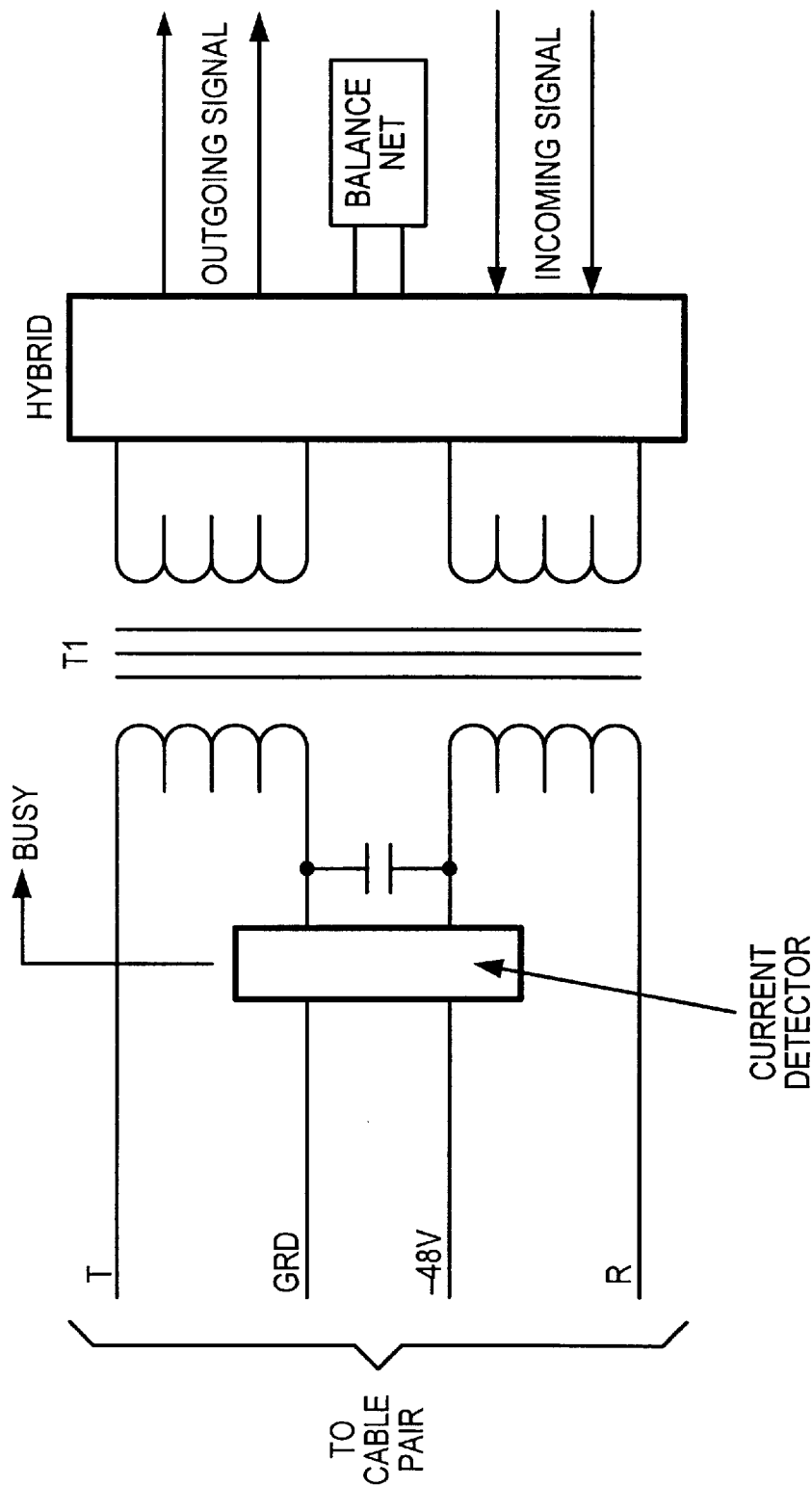
FIG. 11 (prior art) is a circuit diagram of a transformer hybrid.
Figure 12:
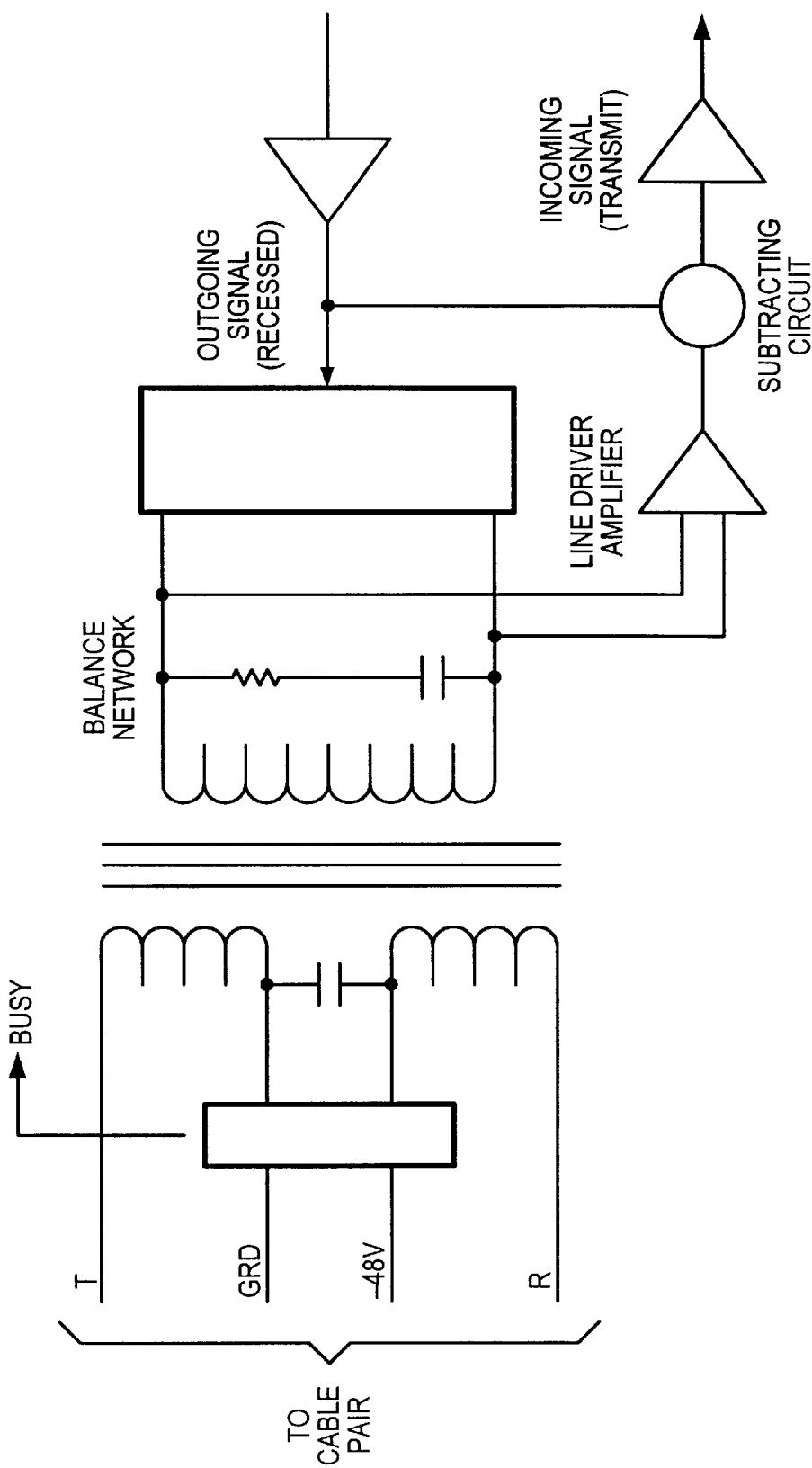
FIG. 12 (prior art) is a circuit diagram of an electronic hybrid.
Figure 13:
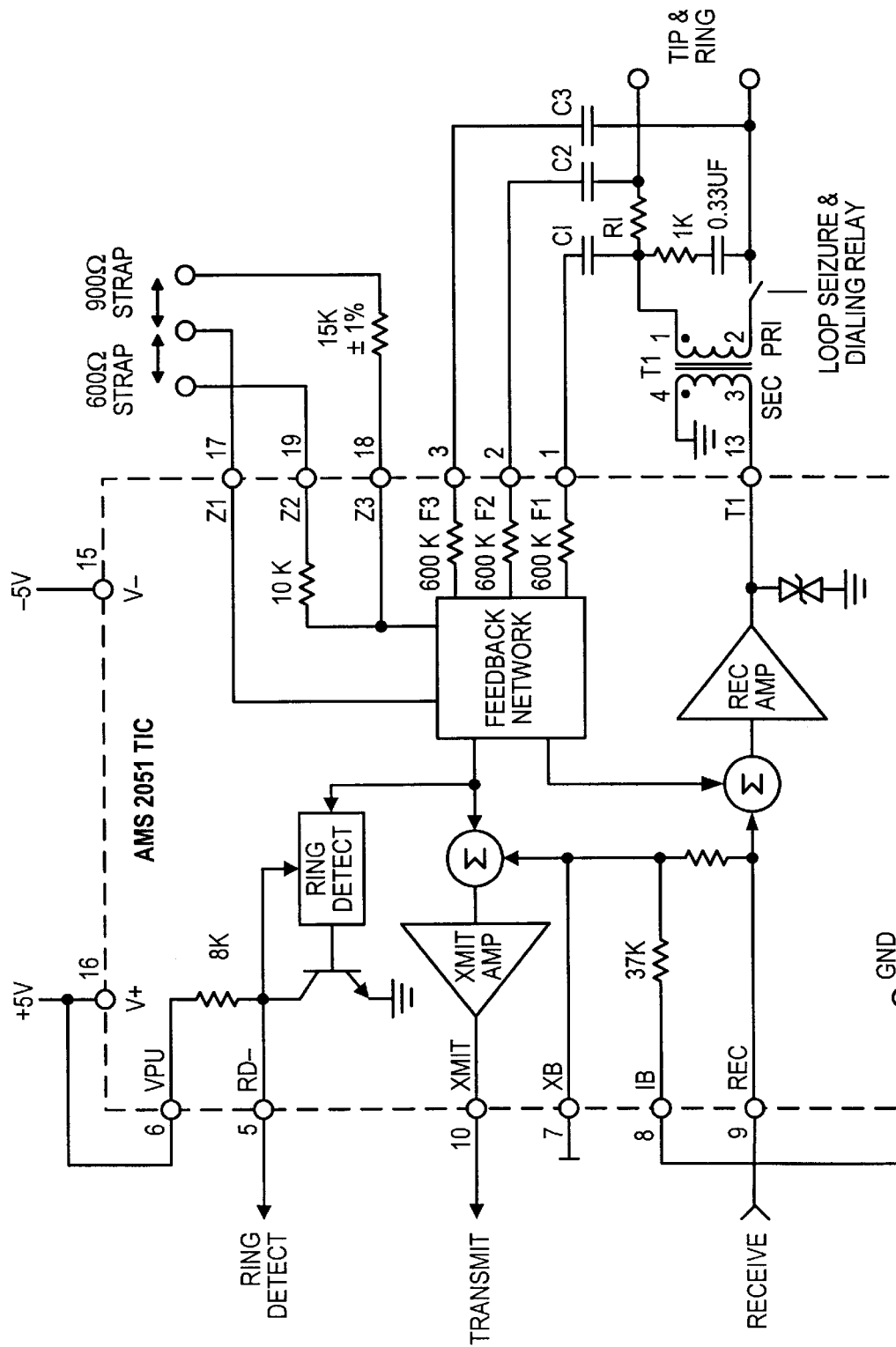
FIG. 13 (prior art) is a circuit diagram of a transformer impedance compensation technique.

The Access Bank™ (FIGS. 9A–9B), incorporates three electronic circuit cards. Two identical Twelve Channel Line Cards (1000 and 1010) and one Line Interface Unit (1020) card make up a full 24 channel bank. The LIU card is mounted in the front of the chassis. The Twelve Channel Line Cards mount side-by-side in the back of the chassis and are removable on card guides.

LINE INTERFACE UNIT (LIU)

The ™ ( FIGS. 9A–9B) incorporates three electronic circuit cards. Two identical Twelve Channel Line Cards (1000 and 1010) and one Line Interface Unit (1020) card make up a full 24 channel bank. The LUI card (1020) is mounted in front of the chassis (not shown). The Twelve Channel Line Cards (1000, 1010) mount side-by-side in the back of the chassis (not shown) and are removable.

The LIU card (1020) has electrical connectors (not shown) for all line and power connections to the Access Bank™. The Test/Monitor Jacks (1021) allow the connection of T1 test equipment to monitor the T1 line performance. The T1 Digital Carrier Input & Output Connector (1022) is the FCC-Registered connection point between the Access Bank™ and a public telecommunications carrier T1 line. Power is supplied to the Access Bank™ by connection to the Battery Input (1031). An unfiltered −48 Volt dc power source (1050) is supplied for powering the Access Bank™ from 115 Volt ac commercial power.

Twenty four Tip and Ring connections (3037) originate from the two Twelve Channel Line Cards (1000 and 1010) within the Access Bank™, and are routed to a telephone line connector on the front of the LIU (1020).

Switches on the front of the Access Bank™ LIU (1020) set user configuration options and initiate Access Bank™ test functions. They are read by the Microprocessor (1035) firmware that controls the LIU (1020). The Self Test switch (1023) disconnects the Access Bank™ from the T1 line and initiates an internal self diagnostic test. A Green Test LED (1027) on the front of the LIU card indicate that the Access Bank™ self test has passed.

The Network Loopback switch (1024) provides manual activation of the Access Bank™ CSU function to retransmit the T1 signal received back to the T1 line.

Option switch (1025) has no currently assigned function. Alarm Cut-Off switch (1026) turns off the internal Alarm Relay (not shown) connected to Pair 25 of the telephone line connector(not shown).

Operational status information is provided with multicolor LEDs apparent from the front of the Access Bank™. LED outputs come from the Microprocessor (1035) firmware that controls the LIU (1020). The Test LED (1027) provides indications for self test results and T1 loopback status. The Status LED (1028) indicates operational status of the LIU card (1020), including indication of the T1 Trunk Processing State. The T1 Line LED (1029) indicates the presence of normal (green) or abnormal (yellow) T1 pulses. The Framing LED (1030) provides indications of normal or abnormal T1 framing conditions as seen from equipment at the far-end of the T1 line.

T1 signals from the T1 Digital Carrier In & Out connection (1022) pass through a Loopback Circuit (1039), which has the ability to connect the internal T1 Transmit (1037) circuit's signal back to the T1 Receive circuit (1038). The Loopback Circuit is activated as part of the Access Bank™ Self Test function to test Access Bank™ internal T1 functionality.

The T1 Framer circuit (1036) provides T1 framing, channel formatting, signaling input and output, and T1 alarm management for the Access Bank™ LIU. It is configured and controlled by the Microprocessor (1035).

Unfiltered, rectified dc power entering Battery Input connector (1031) passes through monitoring and protective circuitry (1032) before providing power to the Ringing Generator (1033) and DC/DC Converters (1034). The Ringing Generator (1033) produces 85 Volts ac/20 Hz power which is used to ring telephone instruments or telephone systems connected to the Access Bank™. The DC/DC Converters originate +5 Volt and −6 Volt supply currents that are used to power electronics on the LIU (1020) and Twelve Channel Line Cards (1000, 1010).

The LIU (1020) connects to each of the Twelve Channel Line Cards by separate electrical connectors (not shown). Supply power, digital signals, and analog signals are passed over each of the two connectors to the Twelve Channel Line Cards (1000, 1010) via a Parallel Bus (3038) and a Power Bus (3039).

TWELVE CHANNEL LINE CARDS

The Twelve Channel Line Cards (1000 and 1010) each have capability to drive 12 loop-start or ground-start telephone lines (3037). Foreign Exchange Station (FXS) interfaces (not shown) provide a standard battery and ringing voltage interface to telephone instruments, Private Branch Exchange trunks, or Key System line interfaces (not shown).

The Coder/Decoder circuit (1004 and 1014) performs both-way conversion of the digital Pulse Code Modulation (PC) samples from the Parallel Bus (3038) to analog voice frequency signals. The analog signals are conditioned by Line Impedance Build Out amplifiers (1003 and 1013). Audio Signal I/O circuits (1002 and 1012) perform amplification and two-wire to four-wire hybrid conversion.

High-voltage Isolation Barriers (1001 and 1011) connect the analog audio signals to the Tip and Ring telephone lines. The Isolation Barrier performs several of the functions commonly defined for a Subscriber Line Interface Circuit (SLIC). These functions are balanced current feed to the telephone line, detection of signaling currents, over-voltage protection, and the application of ringing signals. Opto-electronic devices in the Isolation Barrier circuits (1001 and 1011) are controlled and read by the Line Card Microprocessors (1041 and 1042) to perform signaling functions. The Line Card Microprocessors (1041) report signaling information from each channel of the Access Bank™ to the LIU Microprocessor (1035), which in-turn reads and writes signaling information to the T1 Framer (1036).

Microprocessors (1041 and 1042) also read signaling option settings from Busy/Test switches (1043 and 1044) on the back panel of the Access Bank™. Channel status indications are output by Microprocessors 1041 and 1042 to LED's 1045 and 1046 to show the current signaling state of each voice channel in the Access Bank™.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A floating filter for powering telephone line circuits functioning to attenuate AC ripple noise without the use of large capacitances, comprising:

an input having a voltage with AC and DC components;

an output having a voltage;

a return path;

a load resistor R75;

a voltage regulator;

a voltage divider having an output;

a capacitance in parallel with the output of the voltage divider;

said voltage regulator having an input terminal connected to said input, an output terminal connected to said output and an adjust terminal;

said voltage divider comprising a first resistor R73 connected to the input terminal and the adjust terminal of the voltage regulator;

said voltage divider further comprising a second resistor R74 and a capacitor C28 each connected to the adjust terminal of the voltage regulator, and each connected to the return path;

said load resistor R75 connected to said output terminal of said voltage regulator and said return path, the output voltage of the floating filter equaling a filtered proportion of the value of the rectified AC input voltage, thereby reducing a ripple noise;

wherein a low-pass filter network is formed with resistors (R73,R74) and the capacitor (C28) said network removing the high frequency (audible) components from the error/feedback signal and further allowing a regulator adjustment node (U10) to float and follow the slowly changing (sub-audible) DC+AC input voltages, providing AC ripple rejection without the inherent excessive power dissipation of a fixed output regulator; and wherein the low-pass filter network has a steady state (DC) output of less than an average of the input voltage.

2. The floating filter of claim further comprising:

a filter capacitor C13 connected to said input terminal of said voltage regulator and to said return path; and a filter capacitor C31 connected to said output terminal of said voltage regulator and to said return path.

3. The floating filter of claim 1 further comprising protection circuitry.

4. The protection circuitry of claim 3 further comprising:

a zener diode CR22 see schematic (FIG. 7A) having a cathode connected to the output terminal of said voltage regulator, and an anode connected to the input terminal of said voltage regulator.

5. The protection circuitry of claim 3 further comprising:

an automatic limiting device CR25 functioning to provide a low impedance when voltage (CR25) across the device exceeds a predetermined level connected to said output terminal, and said input terminal of said voltage regulator.

6. The protection circuitry of claim 3 further comprising:

an automatic current limiting device functioning to limit current passing through the device when said current exceeds a predetermined level S9 inserted between said input and said input terminal of the voltage regulator.

7. The protection circuit of claim 3 further comprising:

a diode CR27 having a cathode and an anode, said diode CR27 inserted between said output and said output terminal of said voltage regulator;

said cathode of diode CR27 connected to said output terminal of said voltage regulator; and said anode of diode CR27 connected to said output.

8. The protection circuit of claim 3 further comprising:

a diode CR26 having a cathode and an anode, said CR26 inserted between the said adjusted terminal of said voltage regulator;

said cathode of diode CR26 connected to said adjust terminal of said voltage regulator U3; and said anode of diode CR26 connected to said intersection of resistors R73, R74 and capacitor C28.

9. The floating filter of claim 1 wherein the voltage regulator is a three terminal voltage regulator.

10. The apparatus of claim 1, wherein the AC ripple noise output voltage is attenuated by a factor greater than one.

11. The apparatus of claim 1, wherein the voltage divider formed by R73 & R74 is designed to reduce the output voltage by approximately 20%.

12. The apparatus of claim 1, wherein the values of the low-pass network are selected to attenuate 50 Hz or greater ripple by a factor as high as 100.

* * * * *